United States Patent
Mehr et al.

(10) Patent No.: US 12,511,452 B2
(45) Date of Patent: Dec. 30, 2025

(54) SEGMENTING A 3D MODELED OBJECT REPRESENTING A MECHANICAL PART

(71) Applicant: Dassault Systemes, Vélizy-Villacoublay (FR)

(72) Inventors: Eloi Mehr, Vélizy-Villacoublay (FR); Ariane Jourdan, Vélizy-Villacoublay (FR)

(73) Assignee: Dassault Systemes, Vélizy-Villacoublay (FR)

( * ) Notice: Subject to any disclaimer, the term of this patent is extended or adjusted under 35 U.S.C. 154(b) by 1038 days.

(21) Appl. No.: 17/562,406

(22) Filed: Dec. 27, 2021

(65) Prior Publication Data
US 2022/0261512 A1  Aug. 18, 2022

(30) Foreign Application Priority Data
Feb. 16, 2021 (EP) .................... 21305195

(51) Int. Cl.
*G06F 30/17* (2020.01)
*G06F 30/23* (2020.01)
*G06T 19/20* (2011.01)

(52) U.S. Cl.
CPC .............. *G06F 30/17* (2020.01); *G06F 30/23* (2020.01); *G06T 19/20* (2013.01); *G06T 2219/2008* (2013.01)

(58) Field of Classification Search
CPC ......... G06F 30/17; G06F 30/23; G06T 19/20; G06T 2219/2008; G06T 19/00;
(Continued)

(56) References Cited

U.S. PATENT DOCUMENTS

| 2005/0078178 A1* | 4/2005 | Brown .................... H04N 7/181 348/139 |
| 2016/0203637 A1* | 7/2016 | Luo .......................... G06T 7/174 345/420 |
| 2021/0049759 A1* | 2/2021 | Madabhushi ......... G06T 7/0012 |

FOREIGN PATENT DOCUMENTS

| EP | 3 859 610 A1 | 8/2021 |
| EP | 3 872 771 A1 | 9/2021 |

OTHER PUBLICATIONS

M. Takatsuka, Ray A. Jarvis, "Hierarchical neural networks for learning three dimensional objects from range images", Jan. 1998 (Year: 1998).*

(Continued)

*Primary Examiner* — Rehana Perveen
*Assistant Examiner* — Angel Calle
(74) *Attorney, Agent, or Firm* — Oblon, McClelland, Maier & Neustadt, L.L.P.

(57) ABSTRACT

A computer-implemented method for segmenting a 3D modeled object. The 3D modeled object represents a mechanical part. The method includes obtaining the 3D modeled object. The method further includes performing a hierarchical segmentation of the 3D modeled object. The hierarchical segmentation comprises a first segmentation. The first segmentation includes identifying, among surfaces of the 3D modeled object, first segments each corresponding to a simple geometric surface of the 3D modeled object. A simple geometric surface is a primitive exhibiting at least one slippable motion. The hierarchical segmentation includes then a second segmentation. The second segmentation includes identifying, among non-identified surfaces of the 3D modeled object, second segments each corresponding to a free-form surface of the 3D modeled object. This constitutes an improved method for segmenting a 3D modeled object representing a mechanical part.

11 Claims, 9 Drawing Sheets

(58) Field of Classification Search
CPC ........... G06T 2207/10028; G06T 7/162; G06T 7/187; G06T 17/10; G06T 30/20; G06T 7/10; G06T 17/205; G06T 2111/04
See application file for complete search history.

(56) References Cited

OTHER PUBLICATIONS

Bing Yi, Zhenyu Liu, Jianrong Tan, Fengbei Cheng, Guifang Duan, Ligang Liu, "Shape recognition of CAD models via iterative slippage analysis", Apr. 28, 2014 (Year: 2014).*
Eloi Mehr, Andre Lieutier, Fernando Sanchez Bermudez, Vicent Guitteny, Nicolas Thome, and Matthieu Cord, "Manifold Learning in Quotient Spaces", Jun. 2018 (Year: 2018).*
The extended European search report mailed in corresponding European Application No. 21305132.9 mailed Aug. 11, 2021 (9 pages).
Wei Chen et al: Deep Generative Madel for Efficient 3D Airfoil Parameterization and Generation, arxiv.org, Cornell University Library, 201 Olin Library Cornell University Ithaca, NY 14853, Jan. 7, 2021.
Jerry Liu et al: Interactive 3D Modeling with a Generative Adversarial Network 11 . arxiv.org, Cornell University Library, 201 Olin Library Cornell University Ithaca, NY 14853, Jun. 16, 2017.
Aumentado-Armstrong Tristan et al: Geometric Disentanglement for Generative Latent Shape Models, 2019 IEEE/CVF International On Computer Vision (ICCF), IEEE, Oct. 27, 2019.
Wang Zhihua et al: 3D-PhysNet: Learning the Intuitive Physics of Non-Rigid Object Deformations, Proceedings of the Twenty-Seventh International Joint Conference On Artificial Intelligence, Jul. 13, 2018.
T. Groueix, M. Fisher, V. G. Kim, B. Russell, M. Aubry. AtlasNet: A Papier-Mâché Approach to Learning 3D Surface Generation. In Conference on Computer Vision and Pattern Regognition (CVPR), 2018.
Eloi Mehr, Ariane Jourdan, Nicolas Thome, Matthieu Cord, Vincent Guitteny. DiscoNet: Shapes Learning on Disconnected Manifolds for 3D Editing. In ICCV 2019.
I. Goodfellow, J. Pouget-Abadie, M. Mirza, B. Xu, D. Warde-Farley, S. Ozair, A. Courville, Y. Bengio, Generative Adversarial Nets. In NeurIPS, 2014.
P. Achlioptas, O. Diamanti, I. Mitliagkas, L. Guibas. Learning Representations and Generative Models for 3D Point Clouds. In International Conference on Machine Learning (ICML), 2018.
D. Jack, J. K. Pontes, S. Sridharan, C. Fookes, S. Shirazi, F. Maire, A. Eriksson. Learning free-form deformations for 3d object reconstruction. In Asian Conference on Computer Vision (ACCV), 2018.
M. Sung, Z. Jiang, P. Achlioptas, N. Mitra, L. J. Guibas. DeformSyncNet: Deformation Transfer via Synchronized Shape Deformation Spaces. In SIGGRAPH Asia, 2020.
K. Mo, P. Guerrero, L. Yi, H. Su, P. Wonka, N. Mitra, L. Guibas. StructureNet : Hierarchical Graph Networks for 3D Shape Generation. In SIGGRAPH Asia, 2019.
J. Li, K. Xu, S. Chaudhuri, E. Yumer, H. Zhang, L. Guibas. GRASS: Generative Recursive Autoencoders for Shape Structures. In SIGGRAPH, 2017.
C. Zhu, K. Xu, S. Chaudhuri, L. Yi, L. Guibas, H. Zhang. AdaCoSeg: Adaptive Shape Co-Segmentation With Group Consistency Loss. In International Conference on Computer Vision (CVPR), 2020.
J. Mairal, F. Bach, J. Ponce. Sparse Modeling for Image and Vision Processing. New Foundations and Trends, 2014.
C. Qi, H. Su, K. Mo, L. Guibas, Pointnet: Deep learning on point sets for 3d classification and segmentation. In Conference on Computer Vision and Pattern Recognition (CVPR), 2017.
R. Hanocka, A. Hertz, N. Fish, R. Giryes, S. Fleishman, D. Cohen-Or, Meshonn: A network with an edge.In SIGGRAPH, 2019.
V. Blanz and T. Vetter. A morphable model for the synthesis of 3d faces. In SIGGRAPH, 1999.
W. Wang, D. Ceylan, R. Mech, U. Neumann. 3dn: 3d deformation network. In Conference on Computer Vision and Pattern Regognition (CVPR), 2019.
T. Salimans, I. Goodfellow, W. Zaremba, V. Cheung, A. Radford, X. Chen. Improved Techniques for Training GANs. In NeurIPS, 2016.

\* cited by examiner

SEGMENTING A 3D MODELED OBJECT REPRESENTING A MECHANICAL PART

CROSS-REFERENCE TO RELATED APPLICATIONS

This application claims priority under 35 U.S.C. § 119 or 365 to European Application No. 21305195.6, filed Feb. 16, 2021. The entire contents of the above application are incorporated herein by reference.

FIELD OF THE DISCLOSURE

The disclosure relates to the field of computer programs and systems, and more specifically to a method, system and program for segmenting a 3D modeled object representing a mechanical part.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Within this context and other contexts, segmenting a 3D modeled object, which may also be simply referred to as "3D segmentation" or "segmentation", is gaining wide importance.

Given a 3D modeled object (e.g., a mesh), 3D segmentation generally consists in splitting/partitioning geometrical elements (e.g., the faces, e.g., and thereby possibly other elements such as vertices or edges) of the 3D modeled object into several connected clusters, called segments, where each segment maximizes its inner consistency, while minimizing its similarity with respect to the other segments. The result of the segmentation process yields a partition of the faces into several sets (the segments) in such a way that each segment represents a semantically consistent set with a clear border with respect to the other segments.

Segmentation may be used in shape abstractions processes, where a 3D geometry and/or feature thereof are retrieved from captured 3D data, as discussed for example in reference Kaiser A. et. al., *A survey of Simple Geometric Primitives Detection Methods for Captured 3D data*, Computer Graphics Forum, 2018. Segmentation may also be used in processes for constructing CSG (Constructive Solid Geometry) models (e.g., CSG trees), e.g., from 3D raw data, as discussed for example in references Wu. Q. et. al., *Constructing 3D CSG Models from 3D Raw Point Clouds*, Computer Graphics Forum, 2018, and Shapiro V. et. al., *Separation for Boundary to CSG Conversion*, ACM Transactions on Graphics, Vol. 12, No. 1, January 1993, Pages 35-55. These two references notably use RANSAC-based approaches to detect an initial pool of features from which a feature tree is built.

Within this context, there is still a need for an improved method for segmenting a 3D modeled object representing a mechanical part.

SUMMARY

It is therefore provided a computer-implemented method for segmenting a 3D modeled object. The 3D modeled object represents a mechanical part. The method comprises providing the 3D modeled object. The method further comprises performing a hierarchical segmentation of the 3D modeled object. The hierarchical segmentation comprises a first segmentation. The first segmentation comprises identifying, among surfaces of the 3D modeled object, first segments each corresponding to a simple geometric surface of the 3D modeled object. A simple geometric surface is a primitive exhibiting at least one slippable motion. The hierarchical segmentation comprises then a second segmentation. The second segmentation comprises identifying, among non-identified surfaces of the 3D modeled object, second segments each corresponding to a free-form surface of the 3D modeled object.

The method may comprise one or more of the following:
- in the first segmentation, the identifying comprises exploring and merging neighboring surfaces of the 3D modeled object according to an increasing distance order that is based on one or more first distances quantifying shape similarity between simple geometric surface portions;
- in the second segmentation, the identifying comprises exploring and merging neighboring non-identified surfaces of the 3D modeled object according to an increasing distance order that is based on one or more second distances quantifying shape similarity between free-form surface portions.
- the first segmentation further comprises, for each surface resulting from the merging, according to a decreasing order of surface size:
  - fitting a canonic primitive to the surface;
  - computing a fitting error; and
  - if the fitting error is lower than a predefined fitting threshold, aggregating to the surface neighboring surfaces for which the fitting error is as well lower than the predefined fitting threshold;
  - if the fitting error is larger than the predefined fitting threshold, discarding the surface.
- the first segmentation further comprises filtering the fitted canonic primitives, by discarding each primitive fitting a local canonic area of a free-form surface;
- the filtering further comprises discarding fitted primitives having a size smaller than a predefined size threshold;
- the one or more first distances comprise one or more of:
  - a centroid curvature distance which penalizes mean curvature discrepancy between surfaces;

a border curvature smoothness distance, which rewards curvature smoothness around a boundary between surfaces; and/or a centroid normal distance, which penalizes mean normal directions discrepancy between surfaces, the exploring and the merging in the first segmentation being carried out for each distance comprised in the one or more first distances;

the one or more first distances comprise the centroid curvature distance, the border curvature smoothness distance, and the centroid normal distance;

the centroid curvature distance is of the type:

$$d(N_1, N_2) = \max_{i \in \{min, max\}} (\bar{k}_i^{(1)} - \bar{k}_i^{(2)})^2,$$

where $N_1$ and $N_2$ represent neighboring surfaces and $\bar{k}_{min/max}^{(j)}$ represents a mean minimal or maximal curvature of $N_j$;

the border curvature smoothness distance is of the type:

$$d(N_1, N_2) = \sum_{(f_1, f_2)} \max_{i \in \{min, max\}} \left( \frac{k_i^{(f_1)} - k_i^{(f_2)}}{\left[\min\left(|k_i^{(f_1)}|, |k_i^{(f_2)}|\right)\right]_{[k_0, k_1]}} \right)^2,$$

where $N_1$ and $N_2$ represent neighboring surfaces, $(f_1, f_2)$ represent couples of neighboring surface portions belonging respectively to $N_1$ and $N_2$, and $k_{min/max}^{(f_j)}$ is a minimal or maximal curvature of $f_j$, $[\ldots]_{[k_0, k_1]}$ represents a clamping of a value to the segment $[k_0, k_1]$, and $k_0$ and $k_1$ are regulation values;

the centroid normal distance is of the type $$d(N_1, N_2) = 1 - |\bar{n}^{(1)} \cdot \bar{n}^{(2)}|,$$

where $N_1$ and $N_2$ represent neighboring surfaces, and $\bar{n}^{(j)}$ represents a mean normal of $N_j$;

the one or more second distances consist in one second distance penalizing mean curvature discrepancy between surfaces and/or penalizing irregularity of merged surfaces;

the one second distance is of the type:

$$d(N_1, N_2) = \left( |\bar{k}_{max}^{(1)}| - |\bar{k}_{max}^{(2)}| \right)^2 \times d_{shapefactor}(N_1, N_2), \quad (1)$$

where $N_1$ and $N_2$ represent neighboring surfaces, $\bar{k}_{max}^{(f)}$ represents a mean maximal curvature of $N_j$, and where:

$$d_{shapefactor}(N_1, N_2) = 1 + \max_{i \in \{1,2\}} \left( \left[ \frac{P_{N_1 \cup N_2}}{\sqrt{A_{N_1 \cup N_2}}} - \frac{P_{N_i}}{\sqrt{A_{N_i}}} \right]_{\mathbb{R}^+} \min\left( \frac{A_{N_i}}{\alpha A_{N_{\bar{i}}}}, 1 \right) \right)^2,$$

where $P_N$ represents the perimeter of N, $A_N$ the area of N, $[\ldots]_{\mathbb{R}^+}$ a clamping to $\mathbb{R}^+$, $N_{\bar{i}}$ a node$\in \{N_1, N_2\}$ which isn't $N_i$, and $\alpha$ a hyper-parameter defining a reduced impact of a small surface;

in the first segmentation and/or in the second segmentation, the exploring and merging is based on a constraint that surfaces connected by a boundary corresponding to a known geometrical delimitation between portions of the 3D modeled object cannot be merged;

in the first segmentation, the identifying comprises one or more execution of the exploring and merging each for a respective first distance, each execution being based on a criterion that two surfaces are merged if the respective first distance between these surfaces is lower than a predefined tolerance threshold associated with the respective first distance; and/or in the second segmentation, the identifying comprises one or more execution of the exploring and merging each for a respective second distance, each execution being based on a criterion on the number of second segments or based on a criterion that two surfaces are merged if the respective second distance between these surfaces is lower than a predefined tolerance threshold associated with the respective second distance.

It is further provided a computer program comprising instructions for performing the method.

It is further provided a computer readable data storage medium having recorded thereon the computer program.

It is further provided a computer comprising a processor coupled to a memory, the memory having recorded thereon the computer program.

BRIEF DESCRIPTION OF THE DRAWINGS

Non-limiting examples will now be described, in reference to the accompanying drawings, where.

DETAILED DESCRIPTION

Figure 1:
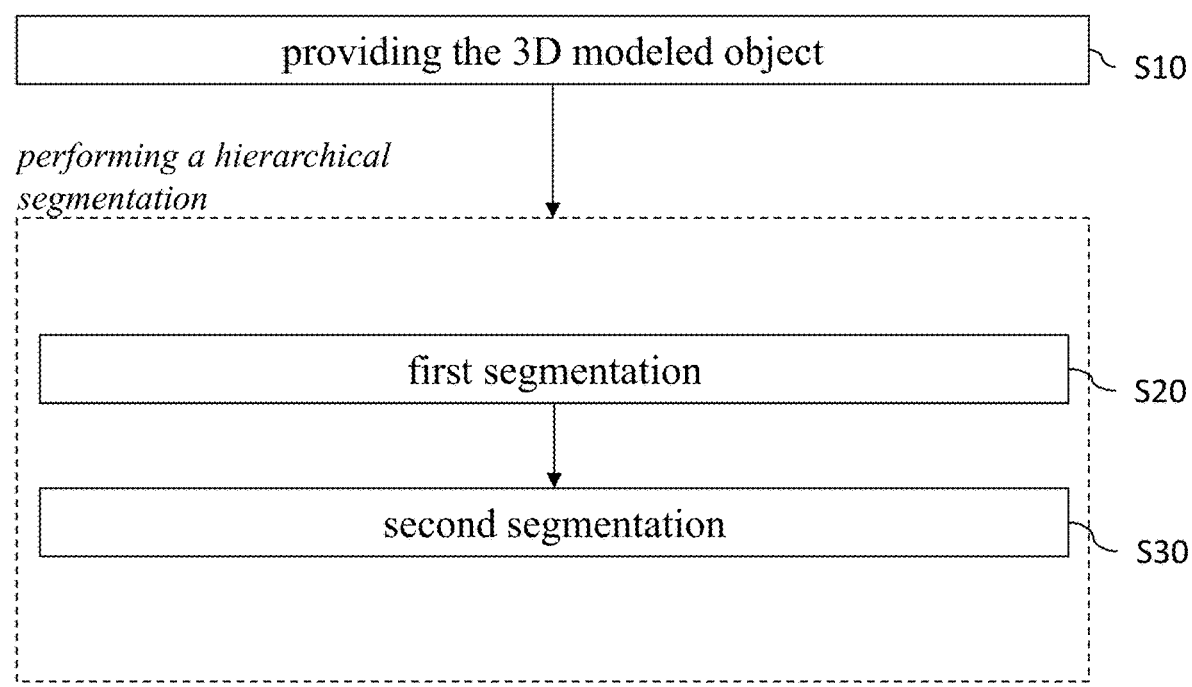
FIG. 1 shows a flowchart of an example of the method.

With reference to the flowchart of FIG. 1, it is proposed a computer-implemented method for segmenting a 3D modeled object. The 3D modeled object represents a mechanical part. The method comprises providing S10 the 3D modeled object. The method further comprises performing a hierarchical segmentation of the 3D modeled object. The hierarchical segmentation comprises a first segmentation S20. The first segmentation S20 comprises identifying, among surfaces of the 3D modeled object, first segments each corresponding to a simple geometric surface of the 3D modeled object. A simple geometric surface is a primitive exhibiting at least one slippable motion. The hierarchical segmentation comprises then a second segmentation S30. The second segmentation S30 comprises identifying, among non-identified surfaces of the 3D modeled object, second segments each corresponding to a free-form surface of the 3D modeled object.

This constitutes an improved method for segmenting a 3D modeled object representing a mechanical part.

Notably, the method segments a 3D modeled object, i.e., provides a set of segments each corresponding to a portion of the 3D modeled object, by identifying both segments corresponding to simple geometric surfaces (i.e., the first segments) and segments corresponding to free-form surfaces (i.e., the second segments). The method thereby provides a robust and accurate segmentation of the 3D modeled object. Indeed, the method does not merely identify segments corresponding to simple geometric surfaces, but also segments corresponding to free-form surfaces, which may be segments that are complex to identify (i.e., fitting geometric primitives or features to these segments is complex due to their free-form geometry). The overall segmentation (i.e., the resulting set of first and second segments) is thus particularly accurate.

Furthermore, the method provides a two-step hierarchical segmentation which improves the efficiency and robustness of the segmentation. Indeed, the method performs initially a first segmentation that identifies the segments corresponding to simple geometric primitives. The method thereby efficiently relies on the consideration that, at first, the simple geometric primitives, rather than the free-form surfaces, may be efficiently identified in the 3D modeled object, and so the method identifies them through the first segmentation S20. Thus, at the end of the first segmentation S20, the method has already yielded a partial segmentation of the 3D modeled object where the segments corresponding to the simple geometric surfaces are already identified. Thereby, there remains then to identify the segments corresponding to free-form surfaces, which the method does through the second segmentation S30. In other words, when it comes to the segments corresponding to the free-form surfaces, which are the most complex ones to identify dur to their free-form geometry, the method identifies these segments within only a portion of the 3D modeled object, since the rest of the 3D modeled object is made of already identified first segments. The two-segmentation approach thus provides efficiency and robustness.

The method is for segmenting a 3D modeled object representing a mechanical part. The method is thus a method of 3D segmentation. As previously explained, given a 3D modeled object (e.g., a mesh), 3D segmentation generally consists in splitting/partitioning the faces of the 3D modeled object into several connected clusters, called segments, where each segment maximizes its inner consistency, while minimizing its similarity with respect to the other segments, the clusters/segments being the result of the segmentation and being possibly referred to as "the segmentation".

The method implements this general segmentation framework. Specifically, the method takes as input the 3D modeled object provided at S10 and outputs a set of segments. The set of segments may be referred to as "the segmentation outputted/yielded by the method" (i.e., of the 3D modeled object), or simply as "the segmentation". In the case of the method, the set of segments consists in the first segments, identified by the first segmentation S20, and the second segments, identified by the second segmentation S30. The set of segments may optionally undergo a post-processing before being outputted by the method as the output segmentation. Although implementing the general segmentation framework, the method is specific in that the overall segmentation performed by the method, which is the hierarchical segmentation, comprises a first segmentation S20 and a second segmentation S30. In other words, the set of segments that the method outputs is identified by a two-step hierarchical segmentation as previously discussed, i.e., by two segmentations (i.e., the first S20 and the second S30) performed in a specific order (i.e., the first S20 before the second S30).

Each segment identified by the method, be it a first segment or a second segment, is a portion of the 3D modeled object constituting a surface which forms a geometrically-coherent portion of the shape of the 3D modeled object. Each segment identified by the method tends to maximize its inner consistency, while minimizing its similarity with respect to the other segments, with a clear border with respect to the other segments. For example, each segment may form an elementary surface of the 3D modeled object, e.g., that can be represented (e.g., fitted and/or parameterized) by a single CAD feature (e.g., a CATIA feature).

Each segment may form a surface which is geometrically-coherent from the point of view of the manufacturing of the mechanical part. In other words, the mechanical part may be, in the real-world, divided into portions, each portion having a respective geometry requiring or adapted to a respective manufacturing process (e.g., molding, additive manufacturing or machining), each portion being represented in the segmentation outputted by the method by one or more segments. In yet other words, the set of segments outputted by the method may consist in subsets each of one or more segments, where for each subset, the one or more segments of the subset altogether represent a surface shape of a portion of the mechanical part (i.e., a layout of material) coherent from a point of view of the manufacturing, i.e., requiring or adapted to a certain manufacturing process (e.g., possibly to be chosen among several suitable manufacturing processes). For example, one or more such subsets may each represent a respective portion of the mechanical part to be manufactured by machining and having each a shape (i.e., a geometry) adapted to be a path of a machining tool. Additionally or alternatively, one or more other subsets may each represent a respective portion of the mechanical part to be manufactured by molding and having each a shape (i.e., a geometry) corresponding to the shape (i.e., the geometry) of a coherent portion of the mold. The mold may itself be manufactured by machining and each such portion may present a shape (i.e., a geometry) adapted to be a path of a machining tool. Additionally or alternatively, one or more other subsets may each represent a respective portion of the mechanical part to be manufactured by additive manufacturing and having each a shape (i.e., a geometry) corresponding to the shape (i.e., the geometry) of a final outer layer formed by the additive manufacturing process. The method thus allows to identify portions of the mechanical part coherent in terms of manufacturing.

As widely known in the field of manufacturing CAD, a segmentation such as the segmentation outputted by the method may be used in various applications or processes which at some step require or need a segmentation. The segmentation of the 3D modeled object according to the method provides an improved representation of the outer surface of the 3D modeled object, which may be of use in many applications. Furthermore, the segments may be parameterized, and thus made editable with CAD tools, further to the segmentation, which allows to manipulate (e.g., edit) these segments, which may also be of use in many applications. By "parameterized", it is meant that each segment may be fitted with exactly one 3D geometrical object represented by a parametric equation or a parametric function, thus involving one or more parameters, wherein the one or more parameters may take values each in a respective continuous range. A 3D parameterized geometrical object allows an easy manipulation and/or editability and/or efficient storage in memory, as opposed to non-parameterized 3D geometrical objects such as discrete representations (e.g., point clouds, meshes, dexel representations). For example, the first segments may be fitted with canonic primitives (e.g., planes, spheres or cylinders) and the second segments parameterized with other adapted geometrical tools, e.g., with free-form parameterized surfaces such as NURBS or extruded surfaces. It is to be noted that the method may already, during the hierarchical segmentation, fit primitives to at least some surfaces of the 3D modeled object (for example the simple geometric surfaces), such that in such a case, at least some segments may be fitted with a primitive and thus editable (i.e., directly as output of the method). In any application of the method, including those discussed hereinafter, the 3D modeled object may be a measured 3D modeled object, so that the method, by performing the segmentation, processes the measured 3D modeled object and allows to ultimately edit the measured 3D modeled object (i.e., once segmented). The method may thereby generally be used to segment a measured 3D modeled object and then processing it into an editable data structure.

In a first application of the method, the segmentation yielded by the method is used for B-rep construction. B-rep construction using segments is discussed in references P. Benko et. al., *Algorithm for reverse engineering boundary representation models*, Computer-Aided Design 33 (2001), 839-851, in A. Tumanin, *Polygonal Mesh to B-Rep Solid Conversion: Algorithm Details and C++ Code Samples*, posted on Sep. 4, 2019 on the Habr website, and in Bénière et. al., *Recovering Primitives in 3D CAD meshes*, Proceedings of SPIE, 2011, which are all incorporated herein by reference. This first application of the method comprises using the segmentation of the 3D modeled object outputted by the method to convert the 3D modeled object into a boundary representation (i.e., a B-rep, which is a collection of connected bounded surface elements, for example under the STEP file format, as widely known). The conversion may comprise fitting surfaces onto each segment, and bound the surfaces (i.e., determine the B-Rep's topological data, that is, the "is bounded by" relationships) using data about the segmentation (for example the segmentation graph's edges in an implementation which is discussed hereinafter). The method may thus be included in a computer-implemented process for converting a 3D modeled object representing a mechanical part into a B-rep, the process comprising:

providing a segmentation of the 3D modeled object by performing the method for the 3D modeled object, which outputs the segmentation of the 3D modeled object according to the method; and converting the 3D modeled object into a B-rep by fitting surfaces onto each segment of the segmentation and bound the surfaces based on the segmentation, according to any known method suitable for such conversion.

In a second application of the method, the segmentation yielded by the method is used for feature-tree construction Feature-tree construction based on segments (e.g., by fitting primitives to the segments) is discussed in references T. Du et. al., *InverseCSG: Automatic Conversion of 3D Models to CSG Trees*, ACM SIGGRAPH ASIA 2018, Wu. Q. et. al., *Constructing 3D CSG Models from 3D Raw Point Clouds*, Computer Graphics Forum, 2018, and Shapiro V. et. al., *Separation for Boundary to CSG Conversion*, ACM Transactions on Graphics, Vol. 12, No. 1, January 1993, Pages 35-55, which are all incorporated herein by reference. This second application of the method comprises using the segmentation of the 3D modeled object outputted by the method to construct a feature tree representation of the 3D modeled object. The construction comprises using first the segmentation outputted by the method and fitting primitives onto each segment to build a pool of CAD features, also referred to as "feature list" from which the feature tree is then built. Compared to known constructions using RANSAC-based approaches, using the segmentation outputted by the method and fitting primitives onto each segment to build the pool/list of features is more robust, scales better, and ensures that all primitives are found. The method may thus be included in a computer-implemented process for constructing a feature tree from a 3D modeled object representing a mechanical part, the process comprising:

providing a segmentation of the 3D modeled object by performing the method for the 3D modeled object, which outputs the segmentation of the 3D modeled object according to the method;

building a pool of CAD features (i.e., a feature list) by fitting surfaces onto each segment of the segmentation according to any known method; and building the feature tree from the fitted surfaces, according to any known method.

In a third application of the method, the segmentation yielded by the method is used for re-meshing (i.e., if the provided 3D modeled object is a 3D mesh) or re-sampling (i.e., if the provided 3D modeled object is a 3D point cloud). The segmentation outputted by the method, which comprises first segments that correspond to simple geometric primitives and that may thus be parameterized by canonic primitives and second segments that correspond to free-form surface and that may thus be parameterized by NURBS, allows the re-meshing (i.e., if the provided 3D modeled object is a 3D mesh) or re-sampling (i.e., if the provided 3D modeled object is a 3D point cloud) of the 3D modeled object, by using each segment's surface definition. This re-meshing/re-sampling may be used to denoise (e.g., removing outlier points, notably for a 3D point cloud, or smoothing the outer surface of the 3D modeled object, notably for a 3D mesh) the 3D modeled object. Additionally or alternatively, it may be used to tessellate efficiently 3D meshes, i.e., adapt the size of the mesh's faces to the curvature of the corresponding surfaces in order to minimize the number of faces thereby optimizing the mesh's weight (i.e., storage-wise) while ensuring a maximal discretization distance to the exact surfaces. The method may thus be included in a computer-implemented process for re-meshing (resp. re-sampling) a 3D modeled object that is a 3D mesh (resp. a 3D point cloud) representing a mechanical part, the process comprising:

providing a segmentation of the 3D modeled object by performing the method for the 3D modeled object, which outputs the segmentation of the 3D modeled object according to the method;

parametrizing the first segments in the segmentation each with a canonic primitive and the second segments in the segmentation with NURBS, thereby yielding surface definitions for all segments in the segmentation; and using each segment's surface definition to re-mesh (resp. re-sample) the 3D mesh (resp. the 3D point cloud), according to any known suitable method;

optionally, one or more of:
  denoising the 3D mesh (resp. 3D point cloud) using the re-meshing (resp. re-sampling); and/or
  tessellating more efficiently the 3D mesh by adapting the size of the mesh's faces to the curvature of the corresponding surfaces in order to optimize the mesh's weight (i.e., storage-wise) while ensuring a maximal discretization distance to the exact surfaces.

In a fourth application of the method, the segmentation yielded by the method is used for detecting anomalies in the 3D modeled object (e.g., manufacturing anomalies). This application may comprise comparing available knowledge of properties that the mechanical part should have with the segments of the segmentation outputted by the method, thereby yielding information about defects or anomalies for the mechanical part. For example, the available knowledge may comprise information such as "a cube portion of the mechanical part should have six large planar faces" or "usual mechanical parts should not have any small face portion". If the 3D modeled object portion which represents the cube is segmented into seven faces, or if some segments represent form faces, this application may comprise deducting that the 3D modeled object features anomalies, such that the mechanical part features anomalies (i.e., manufacturing defects).

The segmentation outputted by the method may be used in other applications of 3D shape segmentation, for example 3D deformation, 3D rendering (geometric/material attributes computation, occlusion culling, shadows determination), 3D animation and/or shape compression. These applications are discussed in previously-cited reference Kaiser A. et. al., *A survey of Simple Geometric Primitives Detection Methods for Captured 3D data*, Computer Graphics Forum, 2018, which is incorporated herein by reference.

Still referring to the flowchart of FIG. 1, the providing S10 of the 3D modeled object is now discussed. Prior to the discussion on the providing S10 of the 3D modeled object, data structures involved therein are now discussed.

The method is for segmenting a 3D modeled object, such that the method generally manipulates modeled objects. A modeled object is any object defined by data stored e.g., in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems.

The 3D modeled object represents a mechanical part. By "3D modeled object", it is meant any object which is modeled by data allowing its 3D representation. A 3D representation allows the viewing of the part from all viewpoints (e.g., from various angles and/or distances). For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e., increases the speed at which designers statistically accomplish their task). This speeds up the manufacturing process in the industry, as the design of the products is part of the manufacturing process.

The 3D modeled object represents the geometry of a product (i.e., the mechanical part) to be manufactured in the real world subsequent to the completion of its virtual design with for instance a CAD software solution or CAD system. The mechanical part may be an assembly of parts, as the assembly of parts may be seen as a part itself from the point of view of the method, or the method may be applied independently to each part of the assembly), or more generally any rigid body assembly (e.g., a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object may thus represent an industrial product which may be any mechanical part, such as a part of a terrestrial vehicle (including e.g., car and light truck equipment, racing cars, motorcycles, truck and motor equipment, trucks and buses, trains), a part of an aerial vehicle (including e.g., airframe equipment, aerospace equipment, propulsion equipment, defense products, airline equipment, space equipment), a part of a naval vehicle (including e.g., navy equipment, commercial ships, offshore equipment, yachts and workboats, marine equipment), a general mechanical part (including e.g., industrial manufacturing machinery, heavy mobile machinery or equipment, installed equipment, industrial equipment product, fabricated metal product, tire manufacturing product), an electro-mechanical or electronic part (including e.g., consumer electronics, security and/or control and/or instrumentation products, computing and communication equipment, semiconductors, medical devices and equipment), a consumer good (including e.g., furniture, home and garden products, leisure goods, fashion products, hard goods retailers' products, soft goods retailers' products), a packaging (including e.g., food and beverage and tobacco, beauty and personal care, household product packaging).

The provided 3D modeled object may form a discrete geometrical representation of the mechanical part. The discrete geometrical representation is herein a data structure which comprises a discrete set of pieces of data. Each piece of data represents a respective geometrical entity positioned in a 3D space. Each geometrical entity represents a respective location of the mechanical part (in other words, a respective portion of material constitutive of a solid represented by the 3D modeled object). The aggregation (i.e., union or juxtaposition) of the geometrical entities represents altogether the mechanical part. The discrete geometrical representation herein may in examples comprise a number of such pieces of data higher than 100, 1000, or 10000.

The discrete geometrical representation may for example be a 3D point cloud, each geometrical entity being a point. The discrete geometrical representation may alternatively be a 3D mesh, each geometrical entity being a mesh tile or face. The 3D mesh may be regular or irregular (i.e., consisting or not of faces of a same type). The 3D mesh may be a polygonal mesh, for example a triangular mesh. The 3D mesh may be obtained from a 3D point cloud, for example by triangulating the 3D point cloud (e.g., with a Delaunay triangulation). The 3D point cloud herein may be determined from physical measurements on the mechanical part, for example within a 3D reconstruction process. The 3D reconstruction process may comprise providing the mechanical part, providing one or more physical sensors each configured for acquiring a respective physical signal, and acquiring one or more respective physical signals by operating the one or more physical sensors on the mechanical part (i.e., scanning the mechanical part with each sensor). The 3D reconstruction may then automatically determine a 3D point cloud and/or a 3D mesh based on the measurements, according to any known technique. The one or more sensors may comprise a plurality of (e.g., RGB, and/or image or video) cameras and the determination may comprise a structure-from-motion analysis. The one or more sensors may alternatively or additionally comprise one or more depth sensors (e.g., on an RGB-depth camera) and the determination may comprise a 3D reconstruction from depth data. The one or more depth sensors may for example comprise a laser (e.g., a lidar) or an ultrasound emitter-receiver.

The providing S10 of the 3D modeled object may comprise retrieving the 3D modeled object, e.g., from a (e.g., distant) database or memory where the 3D modeled object has been stored further to its creation or acquisition or obtention (e.g., through a reconstruction process as previously discussed). For example, the retrieving may comprise accessing the database or memory and downloading the 3D modeled object. Alternatively, the providing of the 3D modeled object may comprise performing physical measurements on the mechanical part and determining the 3D modeled object from the physical measurements, for example through a 3D reconstruction process as previously discussed. The providing of the 3D modeled object may alternatively comprise creating, e.g., by a user, the 3D modeled object, e.g., by sketching it.

Still referring to the flowchart of FIG. 1, further to the providing S10 of the 3D modeled object, the method comprises performing a hierarchical segmentation of the 3D modeled object. The hierarchical segmentation comprises a first segmentation S20 and a second segmentation S30. In other words, the hierarchical segmentation comprises two segmentations: the first segmentation S20 and the second segmentation S30. The first segmentation takes as input the provided 3D modeled object and outputs a partial segmentation thereof, i.e., the first segments. The second segmentation S30, takes as input the part of the 3D modeled object not yet segmented as a result of the first segmentation S20, i.e., the 3D modeled object minus the set of the first segments, and outputs a segmentation thereof, i.e., the second segments. The union of the set of the first segments and of the set of the second segments forms a set of segments which is the result of the hierarchical segmentation. This set of segments forms a segmentation of the 3D modeled object.

Still referring to the flowchart of FIG. 1, the first segmentation S20 is now discussed.

The first segmentation S20 comprises identifying, among surfaces of the 3D modeled object, first segments each corresponding to a simple geometric surface of the 3D modeled object. In other words, the first segmentation S20 finds among the surfaces of the 3D modeled object those which form simple geometric surfaces and identifies them as the first segments. A simple geometric surface is a primitive exhibiting at least one slippable motion. A slippable motion is a linear combination of a translation and of a rotation. In other words, a simple geometric surface is a primitive which is invariant by at least one linear combination of a translation or a rotation. The concept of slippable motion is known from reference Gelfand N. and Guibas L. J., *Shape Segmentation Using Local Slippage Analysis*, Eurographics Symposium on Geometry Processing, 2004, which is incorporated herein by reference. Notably, the content of section 2 of this reference, which provides a definition of the slippable motions and a method for computing them, is incorporated herein by reference. The first segmentation S20 may identify the first segments using any manner of identifying on the 3D modeled object the surfaces which are simple geometric surfaces.

Figure 2:
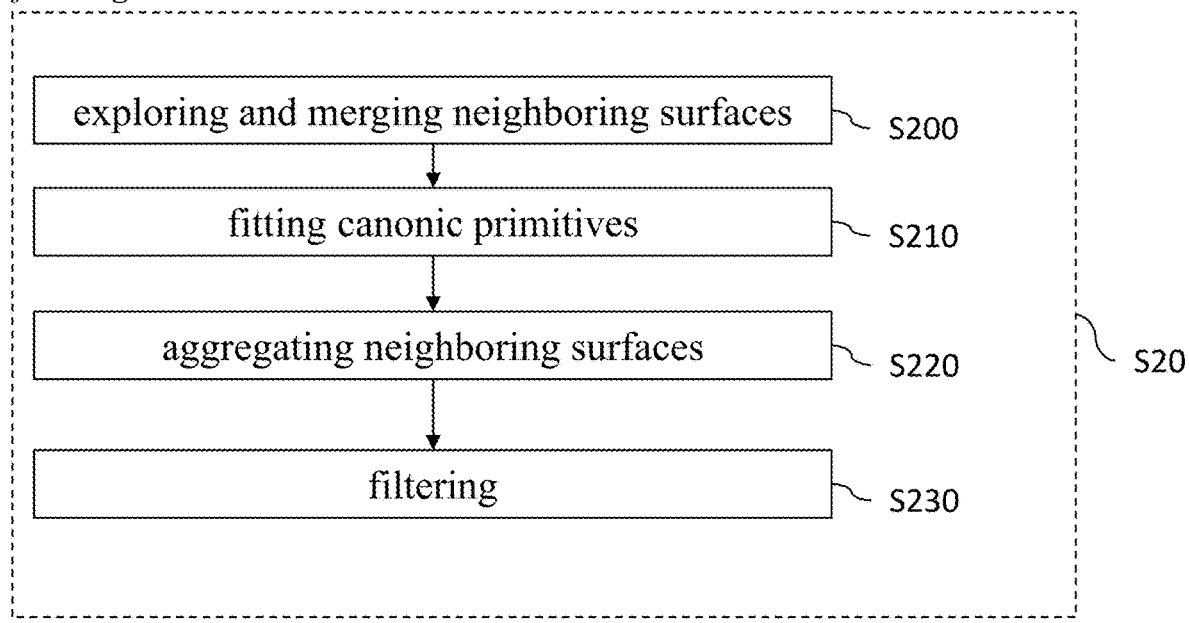
FIG. 2 shows a flowchart of an example of the first segmentation.

Referring now to the flowchart of FIG. 2, which shows a flowchart of an example of the first segmentation S20, the identifying of the first segments may comprise exploring and merging S200 neighboring surfaces of the 3D modeled object. Exploring and merging means that the first segmentation S20 iteratively visits neighboring surfaces of the 3D modeled object and merges them as long as their merge can form or contribute to form a first segment. Each surface is an outer portion of the 3D modeled object. Any surface may be the result of a previous merge of two surfaces. Now, the 3D modeled object may be a 3D mesh. In such a case, a surface is a mesh face (e.g., a triangle if the mesh is a triangular mesh), or a union of mesh faces resulting from a previous merge or iteratively from previous merges. The exploring and merging S200 may in such a case use the mesh structure to iteratively visit neighboring mesh faces, or unions thereof, and merge them where appropriate. Alternatively, the 3D modeled object may be a 3D point cloud, in which case a surface is a surface defined by points of the point cloud. In such a case, the exploring and merging S200 may use the point cloud structure by exploring and clustering neighboring point cloud points, which directly amounts to explore and merge neighboring surfaces defined by point cloud points. In such a case, at the beginning of the exploring and merging, a point may be considered as a surface for the purpose of executing the exploring and merging S200.

The exploring and merging S200 is according to an increasing distance order that is based on one or more first distances. In other words, the exploring and merging S200 is based on data including, for each first distance, values of the first distance each between neighboring surface portions, a surface portion being a portion of a surface. This data may be updated along the exploring and merging S200 as surfaces are iteratively merged, such that new neighboring surfaces with new first distance values are formed. The exploring and merging S200 is according to an increasing distance order that is based on the one or more first distances, i.e., the exploring and merging S200 tends to explore first neighboring surfaces which are close according to the one or more first distances. Now, each first distance quantifies a shape similarity between simple geometric surface portions, i.e., between neighboring simple geometric surface portions as the method uses the first distances between neighboring portions (as neighboring surfaces are to be merged). Each first distance thereby quantifies, during the exploring and merging S200 whether neighboring surfaces comprise neighboring portions forming altogether (i.e., if merged) a portion of one simple geometric surface, and if they do, they tend to be merged. Any such first distance can be used.

The identifying of the first segments may comprise one or more execution of the exploring and merging S200, each for a respective first distance. In other words, the exploring and merging S200 may be repeated for each first distance of the one or more first distances, the first execution being performed on the 3D modeled object and each subsequent execution being performed on the result of the previous execution. In such a case, for each first distance, the exploring and merging S200 for this first distance is according to an increasing distance order based on the first distance: the exploring and merging S200 is based on data including values of the first distance each between a couple of neighboring surfaces, and the exploring and merging S200 explores couples of neighboring surfaces in the increasing order of the values of the first distance between them. The values of the first distance may be updated each time two surfaces are merged: the values, or at least some of them, are recomputed. Each execution of the exploring and merging S200 may be based on a criterion that two surfaces are merged if the respective first distance between these surfaces is lower than a predefined tolerance threshold associated with the respective first distance. In other words, since the execution of the exploring and merging S200 explores neighboring surfaces in the increasing order of the values of the respective first distance, the criterion is that the exploring and merging S200 stops when all the remaining values are larger than the predefined tolerance threshold associated with the respective first distance. The predefined tolerance threshold may be different for all the first distances. In examples, the identifying of the first segments comprises:

for each first distance:

computing, for each couple of neighboring surfaces of the 3D modeled object or of the result of the previous execution of the exploring and merging S200, the value of the first distance between the neighboring surfaces;

exploring and merging S200 the neighboring surfaces, optionally as long as all the values between couples of neighboring surfaces are lower than the predefined tolerance threshold associated with the first distance, including iterations of:

finding the lowest value of the first distance;

merging the corresponding couple of neighboring surfaces, the merging replacing the couple by a new surface;

updating the values of the first distance as a result of the merging.

In an implementation of the method, the exploring and merging S200 (i.e., each execution thereof) uses a hierarchical clustering of a graph $\mathcal{G}$. If the provided 3D modeled object is a mesh, the graph $\mathcal{G}$ is a graph where each node of the graph is a face of the mesh, and two nodes are connected in the graph if and only if the two corresponding faces are adjacent in the mesh. This graph is called the dual graph of the mesh. The 3D modeled object is a 3D point cloud, the graph $\mathcal{G}$ is a k-nearest-neighbor graph $\mathcal{G}$, where each node represents a point, and two nodes are connected in the graph if and only if one node is in the neighborhood of the other, or, alternatively, two nodes are connected in the graph if and only if their distance is below a given threshold. These graph concepts are well known. The method may comprise building the graph $\mathcal{G}$ according to any suitable known method.

The hierarchical clustering gathers the two "most similar" connected nodes at each step, by collapsing the edge connecting these two nodes. The shape similarity between two nodes is evaluated by a first distance between nodes. In the graph, both the nodes and the edges of the graph are modeled, and not only the nodes and their adjacency. Each edge may store information on the border between the two nodes connected by this edge. Furthermore, each edge of the current graph is stored in a binary search tree, sorted by the computed first distance values, therefore it is very efficient to find the "smallest" edge, namely the edge connecting the two most similar nodes. Besides, when two nodes are merged, the clustering updates their attributes into the new merged node, as well as all the edges connecting one of the nodes, and redirects them towards the new merged node. The clustering also updates the first distance values associated to these edges.

Figure 3:
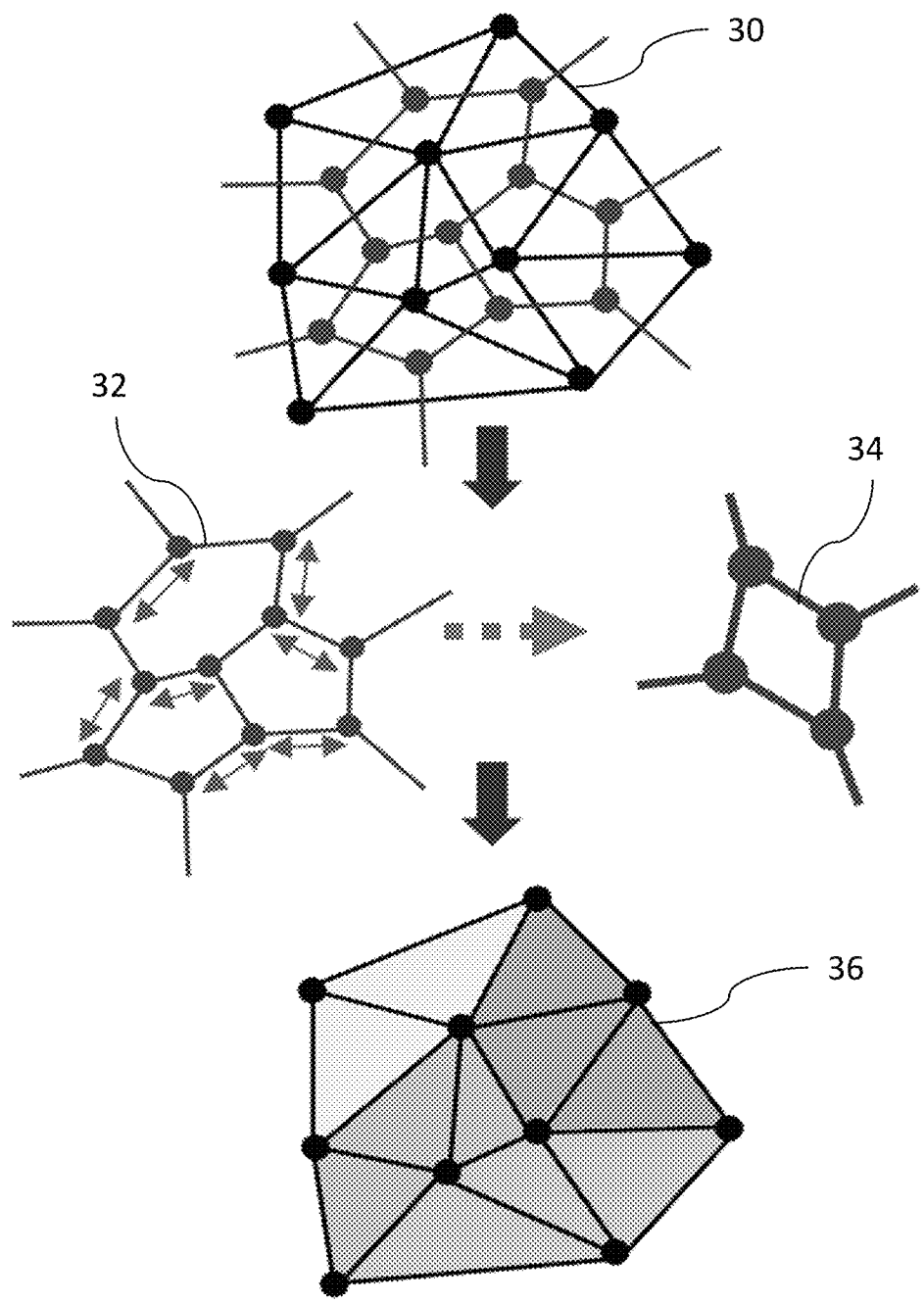
FIGS. 3, 4, 5, 6, 7, 8, 9, 10, 11, 12, 13, 14, 15, 16, 17, 18, 19 and 20 illustrate the method.

FIG. 3 illustrate the concept of hierarchical clustering on a mesh, in 2D for the purpose of simplicity. FIG. 3 shows a mesh 30 and its dual graph 32. FIG. 3 further shows the dual graph 34 after having undergone the hierarchical clustering (i.e., the recursive collapse of the graph nodes) and the corresponding mesh segmentation 36.

The one or more first distances may each be any suitable first distance quantifying a shape similarity between neighboring simple geometric surface portions. By "shape similarity", it is meant that each first distance quantifies an extent to which the neighboring portions, if merged, form a geometrically coherent simple geometric surface or a portion thereof, e.g., with relatively low-varying curvatures and/or normals. Each first distance may be based on a variation of curvature and/or normals between the portions. The one or more first distances may comprise one or more of:

a centroid curvature distance which penalizes mean curvature discrepancy between surfaces (i.e., favors/promotes the merging of surfaces with a low-varying curvature at their border);

a border curvature smoothness distance, which rewards curvature smoothness around a boundary (also referred to as "border") between surfaces (i.e., favors/promotes the merging of surfaces which are locally smooth curvature-wise around their common border); and/or a centroid normal distance, which penalizes mean normal directions discrepancy between surfaces (i.e., favors/promotes the merging of surface with similar normal directions), the exploring and the merging S200 in the first segmentation being carried out for each respective distance comprised in the one or more first distances, as previously explained (i.e., there is one execution of the exploring and merging S200 per first distance, the first execution being performed on the 3D modeled object and each subsequent execution being performed on the result of the previous execution). Alternative first distances could be alternatively use, for example an attribute distribution comparison distance (using for instance the KL-divergence), or a variance comparison distance such as the Ward distance. The more distances (i.e., among the three listed above) are comprised in the one or more first distances, the more the method is robust and efficient. In examples, the one or more first distances comprise the centroid curvature distance, the border curvature smoothness distance, and the centroid normal distance. This makes the method particularly robust.

In examples:

the centroid curvature distance is of the type:

$$d(N_1, N_2) = \max_{i \in \{min,max\}} (\overline{k}_i^{(1)} - \overline{k}_i^{(2)})^2,$$

where $N_1$ and $N_2$ represent neighboring surfaces and $\overline{k}_{min/max}^{(j)}$ represents a mean minimal or maximal curvature of $N_j$;

the border curvature smoothness distance is of the type:

$$d(N_1, N_2) = \sum_{(f_1, f_2)} \max_{i \in \{min,max\}} \left( \frac{k_i^{(f_1)} - k_i^{(f_2)}}{[\min(|k_i^{(f_1)}|, |k_i^{(f_2)}|)]_{[k_0, k_1]}} \right)^2,$$

where $N_1$ and $N_2$ represent neighboring surfaces, $(f_1, f_2)$ represent couples of neighboring surface portions belonging respectively to $N_1$ and $N_2$, and $k_{min/max}^{(f_j)}$ is a minimal or maximal curvature of $f_j$, $[\ldots]_{[k_0, k_1]}$ represents a clamping of a value to the segment $[k_0, k_1]$, and $k_0$ and $k_1$ are regulation values; and the centroid normal distance is of the type $$d(N_1, N_2) = 1 - |\overline{n}^{(1)} \cdot \overline{n}^{(2)}|,$$

where $N_1$ and $N_2$ represent neighboring surfaces, and $\overline{n}^{(j)}$ represents a mean normal of $N_j$.

The first segmentation may thus rely on the comparison of geometric attributes on either points for 3D point clouds, or faces for 3D meshes. As such, the input 3D modeled object (i.e., the provided 3D modeled object) may already be provided at S10 with per element ground truth normals and/or curvatures values. Alternatively, the method may use known algorithms to estimate those attributes, for example at the providing S10 or after the providing S10 but before the first segmentation S20. In case the provided 3D modeled object is a 3D mesh, the method may compute each mesh's face normal as the normal vector to the plane defined by the face. The method may compute a mesh's curvatures at any point using the method devised in reference D. Cohen-Steiner, J. Morvan, *Restricted Delaunay Triangulations and Normal Cycle*, in SCG, 2003, which is incorporated herein by reference. The method may then associate a curvature value to each face of the mesh by using this method on each face's barycenter. In case the provided 3D modeled object is a 3D point cloud, the method may compute the point cloud's normals for example by fitting a plane to each point's neighborhood, and may then estimate a point's normal is by the corresponding fitted plane's normal axis. The method may compute curvatures at each point of the point cloud by fitting quadric surfaces to each point's neighborhood and computing the point's curvatures on this locally-fitted surface.

In the previously discussed implementation which uses the hierarchical graph clustering, the three distances listed above may be used. In other words, the implementation may perform three successive hierarchical clustering of the graph with the three distances and with three different stopping (i.e., tolerance) thresholds associated with these distances in order to segment simple geometric primitives regions/surfaces of the 3D modeled object. The implementation performs the hierarchical clustering of the graph first with the centroid curvature distance until the minimal centroid curvature distance between two nodes is higher than the stopping threshold associated with this distance, then performs the hierarchical clustering of the graph resulting from the previous clustering with the border curvature smoothness distance until the minimal border curvature smoothness distance between two nodes is higher than the stopping threshold associated with this distance, and then performs the hierarchical clustering of the graph resulting from the previous clustering first with the centroid normal distance until the minimal centroid normal distance between two nodes is higher than the stopping threshold associated with this distance.

Since the hierarchical graph clustering works on a graph, the three distances are, in this implementation, defined on graph nodes. The centroid curvature distance is in this implementation defined between two nodes $N_1$ and $N_2$ by the formula:

$$d(N_1, N_2) = \max_{i \in \{min,max\}} (\bar{k}_i^{(1)} - \bar{k}_i^{(2)})^2,$$

where $\bar{k}_{min/max}^{(j)}$ represents the mean min or max curvature of elements of node $N_j$. This distance penalizes pairs of nodes with a large either min or max mean curvature difference, therefore favoring the clustering of regions with a low-varying curvature. The border curvature smoothness distance is in this implementation defined by the formula:

$$d(N_1, N_2) = \sum_{\substack{(f_1, f_2) \\ \in Edges}} \max_{i \in \{min,max\}} \left( \frac{k_i^{(f_1)} - k_i^{(f_2)}}{\left[\min\left(|k_i^{(f_1)}|, |k_i^{(f_2)}|\right)\right]_{[k_0, k_1]}} \right)^2,$$

where $(f_1, f_2)$ are either faces or points belonging respectively to $N_1$ and $N_2$ and connected by an edge in the initial shape graph, that is elements directly around the border common to $N_1$ and $N_2$, $k_{min/max}^{(f_j)}$ is the min or max curvature of element $f_j$, $[\ldots]_{[k_0, k_1]}$ represents the clamping of a value to the segment $[k_0, k_1]$, and $k_0$ and $k_1$ are chosen regulation values. This distance promotes the merging of nodes with a smooth common border (i.e., favors the merging of nodes which are locally smooth curvature-wise around their common frontier), in order to merge together regions of almost constant curvature which belong to a larger non-geometric primitive, and which should therefore not be identified as such. The centroid normal curvature distances, which penalizes the difference in mean normal directions between two nodes, is defined in this implementation by the formula:

$$d(N_1, N_2) = 1 - |\bar{n}^{(1)} \cdot \bar{n}^{(2)}|,$$

where $\bar{n}^{(j)}$ represents the mean normal of elements of node $N_j$. This distance promotes the merging of regions with similar normal directions. As curvatures are usually computed as an average in a local neighborhood and are therefore inexact around the intersections of primitives, this allows to leverage normals to allow the expansion of planar regions much closer to their borders.

Figure 4:
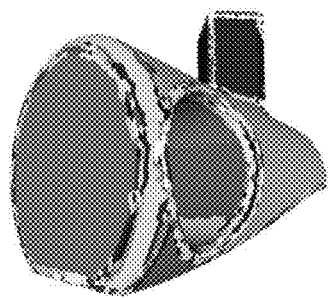
Figure 5:
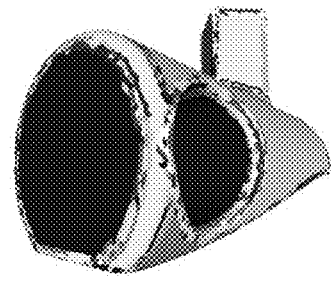
Figure 6:
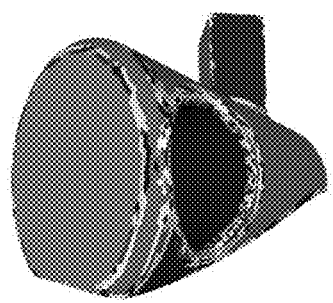

FIGS. 4, 5 and 6 illustrate the result of successive uses of these three distances in the implementation of the method performing the hierarchical graph clustering. FIG. 4 shows a 3D modeled object representing mechanical part with surfaces resulting from the merging according to the hierarchical clustering performed for the centroid curvature distance. FIG. 5 shows then the surfaces resulting from the subsequent merging according to the subsequent hierarchical clustering (i.e., applied to the modeled object as in FIG. 4) performed for the border curvature smoothness distance. FIG. 6 shows then the surfaces resulting from the merging according to the subsequent hierarchical clustering (i.e., applied to the modeled object as in FIG. 5) performed for the centroid normal distance.

Referring back to the flowchart of FIG. 2, the first segmentation S20 may further comprise, further to the exploring and merging S200, for each surface resulting from the merging (i.e., the surfaces of the mesh as outputted by the merging), according to a decreasing order of surface size (e.g., of surface area):

fitting S210 a canonic primitive to the surface, a canonic primitive being a primitive exhibiting at least one slippable motion, the concept of slippable motion having been previously defined and discussed;

computing a fitting error; and if the fitting error is lower than a predefined fitting threshold, aggregating S220 to the surface neighboring surfaces for which the fitting error is as well lower than the predefined fitting threshold;

if the fitting error is larger than the predefined threshold, discarding the surface.

This allows to accurately identify or discard surfaces in case they were not correctly merged/clustered by the exploring and merging S200, which further improves robustness of the method.

By "descending order of size", it is meant that the method explores the surfaces resulting from the merging in the decreasing order of their sizes (e.g., areas) and performs the fitting S210, and possibly the aggregating S220, for these surfaces in this order. The exploration may be limited to the surfaces having large enough sizes (e.g., areas), e.g., larger than a predefined threshold. This allows to efficiently aggregate small merged/clustered surfaces/regions corresponding to a larger geometric primitive before trying to fit them.

The fitting S210 may comprise, given the surface resulting from the merging, which corresponds a clustered node in the case of the previously-discussed implementation, attempting to fit to the surface one or more canonic primitives, e.g., chosen among a set of usual canonic geometric primitives using known primitive fitting techniques such as quadric fitting or BFGS optimization, or any primitive fitting technique discussed in reference A. Kaiser, *A survey of Simple Geometric Primitives Detection Methods for Captured 3D data*, Computer Graphics Forum 38(4), 2018 or in reference T. Birdal et. al., *Generic Primitive Detection in Point Clouds Using Novel Minimal Quadric Fits*, IEEE Transactions on Pattern Analysis and Machine Intelligence, 2019, which are both incorporated herein by reference. Then the method computes a fitting error, for each primitive of the attempt, the primitive with the lowest fitting error being chosen to fit to the surface. The set of usual canonic geometric primitives may include planes, cylinders, cones, and spheres.

If the fitting error for this primitive is lower than a predefined fitting threshold, e.g., if a given proportion of the elements of the surface (e.g., mesh elements if the 3D modeled object is a 3D mesh or point cloud points if the 3D modeled object is a 3D point cloud) have a distance (e.g., Euclidean distance) to the primitive closer than the threshold, then the surface, or the corresponding clustered node in the case of the previously-discussed implementation, is considered to correspond to the fitted primitive. If this is the case, the method then aggregates S220 to the surface neighboring surfaces for which the fitting error is as well lower than the predefined fitting threshold. In other words, the aggregating may comprise iteratively exploring neighboring surfaces of the surface and aggregating/merging them to the surface as long as their distance to the primitive is also lower than the given threshold. In the previously-discussed implementation, the aggregating S220 may perform any known successive neighbor aggregation method which iteratively explores elements (faces in case of the 3D mesh, or vertices in case of the 3D point cloud) of the provided 3D modeled object's graph which are neighbors of elements belonging to the fitted geometric primitive, and add them to the set of primitive elements if their distance to the primitive is also lower than the given threshold, using for example a region growing based approach. This allows to accurately classify all elements belonging to each geometric primitive, even if they weren't correctly clustered due for example to the boundary curvature computation issues.

Still referring to the flowchart of FIG. 2, each surface to which a primitive has been successively fitted at S210 and for which an successive aggregation has then been performed at S220 is an identified surface, i.e., a first segment, e.g., optionally up to the filtering S230 (i.e., if the method comprises the filtering S230 and if the surface is discarded at the filtering S230, the surface is not an identified surface). The surfaces resulting from the merging S200 and for which the fitting error is larger than the predefined fitting threshold are discarded, i.e., they are not identified surfaces.

Still referring to the flowchart of FIG. 2, the first segmentation S20 may further comprise filtering S230 the fitted canonic primitives, by discarding each primitive fitting a local canonic area of a free-form surface. This improves robustness of the method. Indeed, the exploring and merging S200 (also referred to as "clustering", for example in the case of the previously-discussed implementation) and fitting-aggregating S210-S220 may result in some cases in too many primitives that keeps the method form outputting a satisfactory segmentation. There may be some free-form surfaces that comprise many local regions which can be fitted by a canonic primitive, whereas they should not as they are not simple geometric surfaces/primitives. The filtering S230 discards those local regions if they have been fitted. The discarded surfaces are not identified surfaces, while the non-discarded ones are identified surfaces.

In the previously discussed implementation, to discard these unwanted fitted simple geometric surfaces/primitives to areas belonging to larger free-form regions, the method may take advantage of the initial geometric primitive clustering (i.e., the clustering resulting from the hierarchical graph clustering). To identify a fitted canonic primitive which should be discarded, this implementation may compare the size of the node it was fitted on to the size of the nodes to which the aggregated elements belonged. As the second clustering distance promotes the merging of regions smoothly joined to each over, canonic regions belonging to a larger free-form area should be at least in parts merged together. Therefore, if a small remaining node was fitted by a canonic, which aggregates elements from a larger node, without fitting to all of the elements of that larger node—in which case, as nodes are fitted in decreasing order of size, the canonic primitive would already have been fitted to the larger node—this implementation detects that (i.e., comprises detecting that) it corresponds to a local canonic area of a larger free-form region, and discards it (i.e., comprises discarding it).

The filtering S230 may further comprises discarding fitted primitives having a size (e.g., area) smaller than a predefined size threshold.

Figure 7:
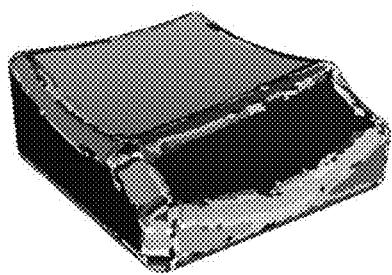
Figure 8:
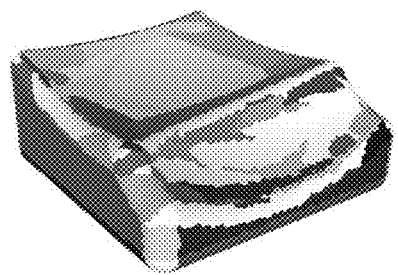
Figure 9:
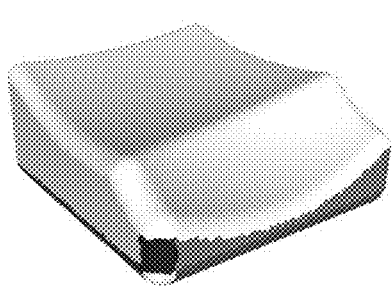

FIGS. 7 to 9 illustrate steps S200 to S230 for the previously-discussed implementation. FIG. 7 shows a 3D modeled object representing a mechanical part, the 3D mesh shown on FIG. 7 being the result of the exploring and merging S200. FIG. 8 shows the result of applying the fitting S210 and the aggregating S220 to the 3D modeled object of FIG. 7. FIG. 9 shows then the result of applying the filtering S230 to the 3D modeled object of FIG. 8.

The first segmentation S20 results in identified surfaces of the 3D modeled object, each identified surface being a first segment corresponding to a simple geometric surface. In other words the first segment has a geometry which is that of the simple geometric surface, i.e., the simple geometric surface fits the first segment. An identified surface is either a surface resulting from the merging S200, either a surface resulting from the subsequent fitting S210 and aggregating S220 (i.e., a surface resulting from the merging S200 and to which a primitive was fitted at S210 and to which neighboring surfaces have been successfully aggregated at S220) if the first segmentation S20 comprises these steps, or a surface resulting from the filtering S230 (i.e., a surface non-discarded at step S230) if the first segmentation S20 comprises this step. Besides these first surfaces, the 3D modeled object still comprises non-identified surfaces which are surfaces that do not result from the merging S200 or surfaces that have been discarded at steps S210-S220 or S230.

Referring back to the flowchart of FIG. 1, further to the first segmentation S20, the performing of the hierarchical segmentation then comprises a second segmentation S30. The second segmentation comprises identifying, among the non-identified surfaces of the 3D modeled object, second segments each corresponding to a free-form surface of the 3D modeled object. A free-form surface is any surface that is not a simple geometric surface. A free-form surface can thus not be fitted or parameterized by a simple primitives, but may still be parameterized using suitable tools (e.g., NURBS). The second segmentation S30 is based on the consideration that the simple geometries of the surface of the mesh (i.e., the first segments) have been all identified by the first segmentation S20, and thus that the remaining geometries of the surface of the mesh are the free-form geometries, which are identified as the second segments by the second segmentation S30. Therefore, performing the second segmentation S30 after the first segmentation S20 and only on the non-identified surfaces of the 3D modeled object contributes to ensure that free-form surfaces are identified by the second segmentation S30. Each second segment corresponds to a free-form surface, i.e., the second segment has a geometry which is that of the free form surface, and may for example be parameterized using NURBS.

The identifying of the second segments may comprise exploring and merging neighboring non-identified surfaces of the 3D modeled object. This may be referred to as "the second exploring and merging", as it refers to the exploring and merging of the second segmentation S30, to distinguish from that of the first segmentation S20. Exploring and merging means that the second segmentation S30 iteratively visits neighboring non-identified surfaces of the 3D modeled object and merges them as long as their merge can form or contribute to form a second segment. As previously explained, each surface is an outer portion of the 3D modeled object, and may be the result of a previous merge of two surfaces. As also previously explained, the 3D modeled object may be a 3D mesh, in which case a surface is a mesh face (e.g., a triangle if the mesh is a triangular mesh), or a union of mesh faces resulting a from previous merge or iteratively from previous merges. The second exploring and merging may in such a case use the mesh structure to iteratively visit neighboring mesh faces, or unions thereof, and merge them where appropriate. As also previously explained, alternatively, the 3D modeled object may be a 3D point cloud, in which case a surface is a surface defined by points of the point cloud. In such a case, the second exploring and merging may use the point cloud structure by exploring and clustering neighboring point cloud points, which directly amounts to explore and merge neighboring surfaces defined by point cloud points. In such a case, at the beginning of the second exploring an merging, a point may be considered as a surface. Prior to the second exploring and merging, the method may comprise marking the first segments as identified and as not to be explored by the second exploring and merging.

The second exploring and merging is according to an increasing distance order that is based on one or more second distances. In other words, the second exploring and merging is based on data including, for each second distance, values of the second distance each between neighboring surface portions, a surface portion being a portion of a surface. This data may be updated along the second exploring and merging as surfaces are iteratively merged, such that new neighboring surfaces with new second distance values are formed. The second exploring and merging is according to an increasing distance order that is based on the one or more second distances, i.e., the exploring and merging tends to explore first neighboring surfaces which are close according to the one or more second distances. Now, each second distance quantifies a shape similarity between free-form surface portions, i.e., between neighboring free-form surface portions as the method uses the distances between neighboring portions (as neighboring surfaces are to be merged). Each second distance thereby quantifies, during the second exploring and merging whether neighboring surfaces comprise neighboring portions forming a geometrically coherent portion of a free-form surface, and if they do, they tend to be merged. In other words, by "shape similarity", it is meant in case of a second distance that the second distance quantifies an extent to which the neighboring portions, if merged, form a geometrically coherent free-form geometric surface or a portion thereof. Any such second distance can be used.

The identifying of the second segments may comprise one or more execution of the second exploring and merging, each for a respective second distance, as it was for the first exploring and merging S200. In such a case, for each second distance, the second exploring and merging for this second distance is according to an increasing distance order based on the second distance: the second exploring and merging is based on data including values of the second distance each between a couple of neighboring surfaces, and this for all the non-identified surfaces of the 3D modeled object, and the second exploring and merging explores couples of neighboring surfaces in the increasing order of the values of the second distance between them. The values of the second distance may be updated each time two surfaces are merged: the values, or at least some of them, are recomputed. Each execution of the second exploring and merging may be based on a criterion that two surfaces are merged if the respective second distance between these surfaces is lower than a predefined tolerance threshold associated with the respective second distance. In other words, since the execution of the second exploring and merging explores neighboring surfaces in the increasing order of the values of the respective second distance, the criterion is that the second exploring and merging stops when all the values are larger than the predefined tolerance threshold associated with the respective second distance. Alternatively, the execution of the second exploring and merging may be based on a criterion on the number of second segments, i.e., a target number, e.g., a maximal number or minimal number, of second segments (i.e., the second exploring and merging stops once the target number is reached). In examples, the identifying of the second segments comprises:

for each second distance:
computing, for each couple of neighboring non-identified surfaces of the 3D modeled object or resulting from a previous execution of the second exploring and merging, the value of the second distance between the neighboring surfaces;
exploring and merging the neighboring surfaces, optionally as long as all the values between couples of neighboring surfaces are lower than the predefined tolerance threshold associated with the second distance or as long as the target number of second segments is not reached, including iterations of:
finding the lowest value of the second distance;
merging the corresponding couple of neighboring surfaces, the merging replacing the couple by a new surface;
updating the values of the second distance as a result of the merging.

In the previously discussed implementation of the method, the second exploring and merging uses, as the first exploring and merging S200, a hierarchical clustering of the graph $\mathcal{G}$ which has been previously discussed for the first exploring and merging S200. As for the first exploring and merging S200, the hierarchical clustering used by the second exploring and merging gathers the two "most similar" connected nodes at each step, by collapsing the edge connecting these two nodes. The shape similarity between two nodes is now evaluated by a second distance between nodes. As in the first exploring and merging S200, each edge may store information on the border between the two nodes connected by this edge. Furthermore, each edge of the current graph is still stored in a binary search tree, sorted now by the computed second distance values, therefore it is very efficient to find the "smallest" edge, namely the edge connecting the two most similar nodes. Besides, when two nodes are merged, the clustering updates their attributes into the new merged node, as well as all the edges connecting one of the nodes, and redirects them towards the new merged node. The clustering also updates the clustering distance values associated to these edges. The main difference with the hierarchical clustering used by the first exploring and merging S200 is that the edges connecting two surfaces for which at least one surface belongs to an identified first segment is marked with an infinite value for the second distance. The implementation may comprise marking these edges like this prior to the second hierarchical clustering. Thereby, this edge has no chance to be explored by the second hierarchical clustering (i.e., that performs for the second exploring and merging). The second hierarchical clustering may stop either when the minimum distance between pairs of nodes is higher than a given threshold, or when another defined energy is minimized, or manually when a user deems the result satisfactory.

In examples, the one or more second distances consist in one second distance penalizing mean curvature discrepancy between surfaces and/or penalizing irregularity of merged surfaces. In other words, the one second distance may comprise a first term penalizing mean curvature discrepancy between surfaces and/or a second term penalizing irregularity of merged surfaces. Alternatively, the second term may promote smoothness of a boundary between neighboring surfaces. The distance may for example be a multiplication of the two terms. The one second distance may be of the type:

$$d(N_1,N_2)=(|\overline{k}_{max}^{(1)}|-|\overline{k}_{max}^{(2)}|)^2 \times d_{shape\ factor}(N_1,N_2),$$

where $N_1$ and $N_2$ represent neighboring surfaces, $\overline{k}_{max}^{(j)}$ represents a mean maximal curvature of $N_j$, and where:

$$d_{shapefactor}(N_1, N_2) = 1 + \max_{i \in \{1,2\}}\left(\left[\frac{P_{N_1 \cup N_2}}{\sqrt{A_{N_1 \cup N_2}}} - \frac{P_{N_i}}{\sqrt{A_{N_i}}}\right]_{\mathbb{R}^+} \min\left(\frac{A_{N_{\overline{i}}}}{\alpha A_{N_i}}, 1\right)\right)^2,$$

where $P_N$ represents the perimeter of N, $A_N$ the area of N, $[\ldots]_{\mathbb{R}^+}$ a clamping to $\mathbb{R}^+$, $N_{\overline{i}}$ a node∈ $\{N_1, N_2\}$ which isn't $N_i$, and $\alpha$ a hyper-parameter defining a reduced impact of a small surface. $(|\overline{k}_{max}^{(1)}|-|\overline{k}_{max}^{(2)}|)^2$ is the first term and $d_{shape\ factor}(N_1, N_2)$ is the second term.

The second hierarchical clustering of the previously-discussed implementation may use the one second distance described above and no other second distance (i.e., only one execution of the clustering is performed). As the second hierarchical clustering works on graph nodes, the one second distance is in this case defined between two adjacent nodes $N_1$ and $N_2$ by the formula:

$$d(N_1,N_2)=(|\overline{k}_{max}^{(1)}|-|\overline{k}_{max}^{(2)}|)^2 \times d_{shape\ factor}(N_1,N_2).$$

This distance amounts to comparing the mean maximum curvature of regions, weighted by a term which attempts to regularize the shape factor of the merged regions. A shape factor is a quantity which discriminates irregular surfaces. The shape factor may be given by the formula:

$$d_{shapefactor}(N_1, N_2) = 1 + \max_{i \in \{1,2\}}\left(\left[\frac{P_{N_1 \cup N_2}}{\sqrt{A_{N_1 \cup N_2}}} - \frac{P_{N_i}}{\sqrt{A_{N_i}}}\right]_{\mathbb{R}^+} \min\left(\frac{A_{N_{\overline{i}}}}{\alpha A_{N_i}}, 1\right)\right)^2,$$

where $P_N$ represents the perimeter of a node N, $A_N$ its area, $[\ldots]_{\mathbb{R}^+}$ the clamping to $\mathbb{R}^+$, $N_{\overline{i}}$ the node∈ $\{N_1, N_2\}$ which isn't $N_i$, and $\alpha$ a hyper-parameter defining the reduced impact of a relatively small node. This shape factor penalizes the increase of non-circularity—that is how far from the regularity of a circle a shape is—resulting from the merge of two nodes compared to that of the two initial nodes, weighted by the relative sizes of the nodes, to not overly penalize the merge of a large irregular node with a small regular one. An increase of non-circularity is considered, and not its value itself, as not all segmented regions have to be circular, but merges which improve region regularity instead of deteriorating it are to be favored. Another example of a shape factor that may be alternatively used is one promoting the smoothness of a region's boundaries by, for instance, on a mesh, penalizing the sum of the angles between adjacent edges. In order to improve robustness, before clustering the non-canonic surfaces of the 3D shape, the implementation may re-compute the curvatures of the elements of the 3D shapes which do not belong to a canonic using only other non-canonic elements as neighbors to average over. This gives more accurate curvature values around the intersections of free-form surfaces and canonic primitive surfaces.

Figure 10:
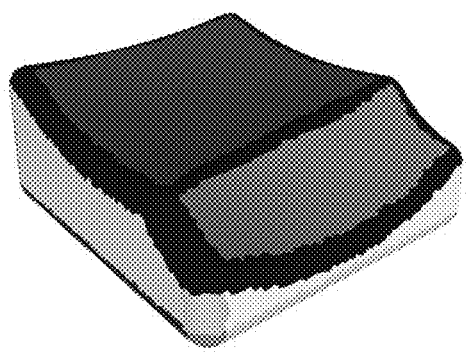

FIG. 10 shows the result of the second hierarchical clustering performed by the previously discussed implementation on the 3D modeled object of FIG. 9.

In examples, in the first segmentation and/or in the second segmentation, the exploring and merging (i.e., the first one S200 and/or the second one) is based on a constraint that surfaces connected by a boundary corresponding to a known geometrical delimitation between portions of the 3D modeled object cannot be merged. These constraints on surfaces may be referred to as "boundary prior" and capture the fact that prior knowledge on the mechanical part implies that some surfaces must not be merged as their boundary corresponds to a known delimitation between portion of the mechanical part corresponding to the surfaces. In the case of the previously discussed implementation, edges of the graph may be associated with a boundary prior. For example, the distance associated with the graph edge (e.g., a first distance in case of the first hierarchical clustering and a second distance in case of the second hierarchical clustering) may be set as infinite. The boundary prior may be set, i.e., not computed. Alternatively, the method may comprise computing the boundary prior (e.g., for each concerned edge in case of the previously discussed implementation). The boundary prior values can be updated along the merging (first and/or second). For example, in the previously-discussed implementation, the boundary prior associated with the edges can be updated by, for each new edge, determining the proportion of boundary prior edges comprising it.

When the 3D modeled object is a 3D mesh, the computation of the boundary prior may use the knowledge of dihedral angles between two adjacent faces—that is the angle between each face's normal vectors—to compute a boundary prior value for the edge common to those two adjacent faces. Indeed, if two faces have a large enough dihedral angle, they cannot belong to a same smooth surface. In the graph of the previously discussed implementation, they are therefore to be separated by an edge representing an un-crossable surface boundary. When the 3D modeled object is a 3D point cloud, the boundary prior may be computed for each initial graph edge as the angle between the normals of the two points corresponding to this edge.

Figure 11:
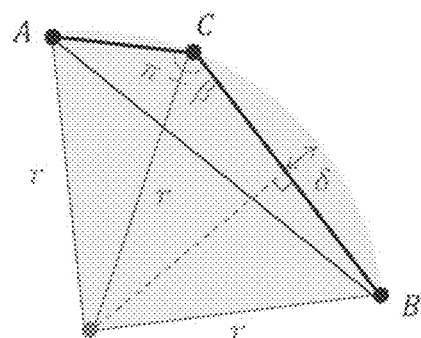

When the 3D modeled object is a tessellated 3D mesh, the computation of the boundary prior may use the knowledge that the tessellated mesh is designed such that it satisfies a maximum fixed distance $\delta_0$ between its discretized mesh and the exact surface it approximates. To use this knowledge, the computation may determine the maximum distance between two adjacent faces and a cylindrical surface passing through the two faces' common edge as well as the two opposite vertices, as illustrated on FIG. 11. The cylindrical surface approximates the smooth constant curvature surface from which both faces would be sampled if they belonged to a same surface. On FIG. 11, C represents the projection of the common edge in a plane orthogonal to both faces, A and B the opposite vertices of both faces. AC and CB are therefore the projections of both faces. $\beta$ is the dihedral angle between the normals of both faces, and r the radius of the cylinder described above. $\delta$ is the maximum distance between the two faces and the cylinder, that is the theoretical tessellation error of the two faces if they were to be approximations of a same surface. $\delta$ may be the distance between the face CB and the cylinder. The Pythagorean theorem yields $$\delta = r - \sqrt{r^2 - \left(\frac{BC}{2}\right)^2}.$$

The law of sines and circumcircles then yields $$2r = \frac{AB}{\sin(\beta)}.$$

Combining both equations yields $$\delta = \frac{AB}{2\sin(\beta)} - \sqrt{\left(\frac{AB}{2\sin(\beta)}\right)^2 - \left(\frac{BC}{2}\right)^2}.$$

These formula may be used to compute a theoretical approximation error for each pair of adjacent faces under the assumption that they belong to a same surface primitive, which, when compared to the maximum tolerated tessellation distance $\delta_0$ to the exact surface it approximates, yields a boundary prior value for edges.

Figure 12:
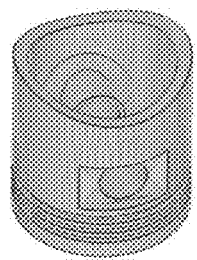
Figure 13:
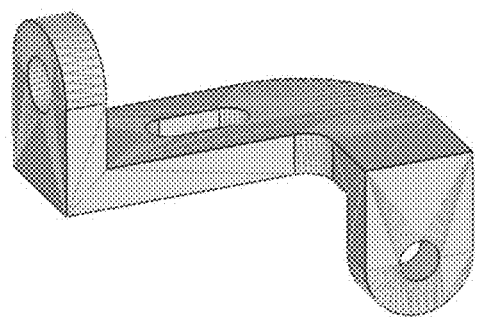

FIGS. 12 and 13 show two 3D modeled objects representing two mechanical parts with their respective computed boundary priors illustrated as solid black lines.

The method may comprise, once the first segments and second segments have been identified, a final post-processing step to classify isolated elements and finalize the whole segmentation performed by the method. The post-processing is optional and may not be performed in some cases. Isolated elements may occur for instance when borders between surfaces are noisy, resulting in either incorrect sharpness and/or curvature values, making the clustering of elements around those borders difficult. In this case, the method may comprise to stop the merging (e.g., the clustering in the case of the previously-discussed implementation) earlier, and classify those remaining elements using another strategy, for instance by assigning them to the closest segment. Another additional or alternative possible post-processing may consist in the processing of the regions' boundaries to make them smoother.

The previously-discussed implementation is now further discussed with reference to FIGS. 14 to 20, with examples of segmentations obtained with this implementation, by using the three first distances and the one second distance for which formulas have been given hereinabove.

Figure 14:
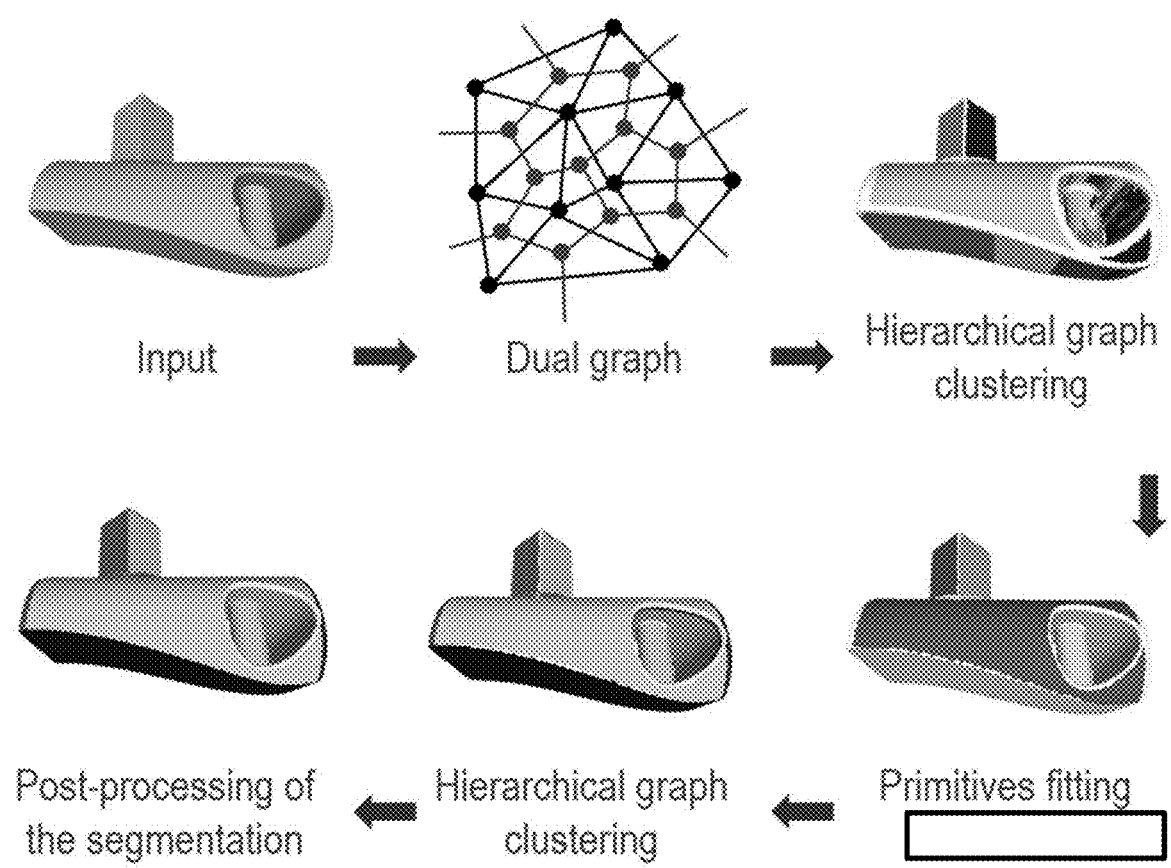

FIG. 14 illustrates a pipeline of the whole segmentation method for the implementation. The implementation provides a computationally efficient hierarchical clustering in two mains steps. As shown on FIG. 14, in a first step S20 of the hierarchical segmentation, only simple geometric primitives are segmented. The primitives are then detected and fitted on the corresponding regions, in order to filter the wrong ones and extend the remaining ones to neighboring faces, similarly to a region growing process. In a second step S30, the hierarchical segmentation freezes these primitives and their corresponding regions, and segments the remaining free-form surfaces. This separation of the segmentation in two distinct steps allows to leverage the strong regularity of simple geometric primitives in the conception of their specific clustering distances, as well as the knowledge of exact definitions of these simple primitives which allows for a robust classification of inliers. Overall, handling those simple primitives in a first pass, before the free-form ones, allows for a much more robust global pipeline, as the added robustness that simple geometric primitive regularities and explicit definitions provides is fully leveraged. In the end, the implementation may post-process the segmentation to remove very small regions or isolated faces. As previously explained, the hierarchical clustering is based on a graph topology: a dual graph formulation for mesh inputs, or a nearest neighbor graph for point cloud inputs. The distances between two connected regions are based on curvatures of their faces (or points), as well as a shape factor favoring smooth boundaries. An additional distance describing the smoothness of the border of two connected regions is also used, in order to prevent the merge of two similar regions separated by a sharp border. This implementation provides a fast and sound (i.e., robust) framework for CAD segmentation of both point clouds or meshes. Moreover, it is able to segment simple geometric primitives, but also complex ones (based on extrudes for examples) as well as complete free-form surfaces (such as fillets or NURBS).

Figure 15:
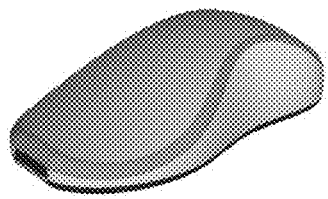

FIG. 15 shows a 3D modeled object representing a computer mouse outer shell and having been segmented by the previously-discussed implementation. The mouse's outer shell may be molded, for example the mouse's outer shell may be made of injection-molded plastic. The different segments correspond to the mold, i.e., each segment forms a geometry that correspond to a corresponding geometry of a portion of the mold. The mold may itself be manufactured by machining and the portion may present a shape (i.e., a geometry) adapted to be a path of a machining tool.

Figure 16:
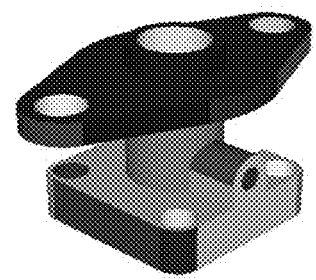

FIG. 16 shows a 3D modeled object representing a mechanical part and having been segmented by the previously-discussed implementation. The segmentation comprises fillets, i.e., segments forming each a filet feature. These segments correspond to filleted portions of the mechanical part that may be manufactured using corner rounding end mills. The segmentation comprises cylinder holes, i.e., segments forming each a cylinder hole feature. These segments correspond to cylinder holes portions of the mechanical part that may be manufactured using a milling machine. The segmentation comprises planes, i.e., segments forming each a plane feature. These segments correspond to plane portions of the mechanical part that may be manufactured using a laser or a hydraulic cutting machine.

Figure 17:
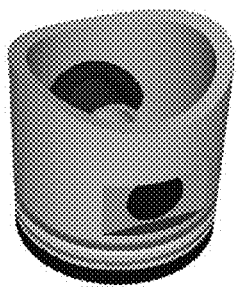

FIG. 17 shows a 3D modeled object representing a mechanical part and having been segmented by the previously-discussed implementation. The segmentation comprises outer cylinders, i.e., segments forming each an outer cylinder feature. These segments correspond to outer cylinder portions of the mechanical part that may be manufactured using a metal lathe.

Figure 18:
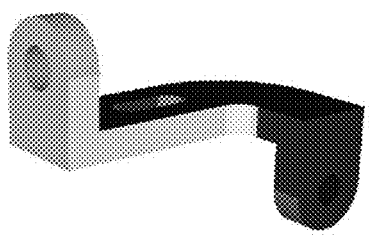

FIG. 18 shows a 3D modeled object representing a mechanical part and having been segmented by the previously-discussed implementation. The segmentation comprises fillets, i.e., segments forming each a filet feature. These segments correspond to filleted portions of the mechanical part that may be manufactured using corner rounding end mills. The segmentation comprises cylinder holes, i.e., segments forming each a cylinder hole feature. These segments correspond to cylinder holes portions of the mechanical part that may be manufactured using a milling machine. The segmentation comprises planes, i.e., segments forming each a plane feature. These segments correspond to plane portions of the mechanical part.

Figure 19:
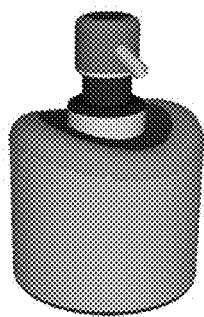

FIG. 19 shows a 3D modeled object representing a soap dispenser and having been segmented by the previously-discussed implementation. The segmentation comprises outer cylinders, i.e., segments forming each an outer cylinder feature. These segments correspond to outer cylinder portions of the soap dispenser that may be manufactured using a metal lathe. The segmentation comprises smooth corners, i.e., segments forming each a smooth corner feature, which is a combination of a chamfer feature and a filet feature. These segments correspond to smooth corner portions of the soap dispenser that may be manufactured using chamfer end mills and corner rounding end mills.

Figure 20:

FIG. 20 shows a 3D modeled object representing a connecting rod and having been segmented by the previously-discussed implementation. The segmentation comprises fillets, i.e., segments forming each a filet feature. These segments correspond to filleted portions of the connecting rod that may be manufactured using corner rounding end mills. The segmentation comprises cylinder holes, i.e., segments forming each a cylinder hole feature. These segments correspond to cylinder holes portions of the connecting rod that may be manufactured using a milling machine. The segmentation comprises planes, i.e., segments forming each a plane feature. These segments correspond to plane portions of the connecting rod that may be manufactured using a laser or a hydraulic cutting machine.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 21:
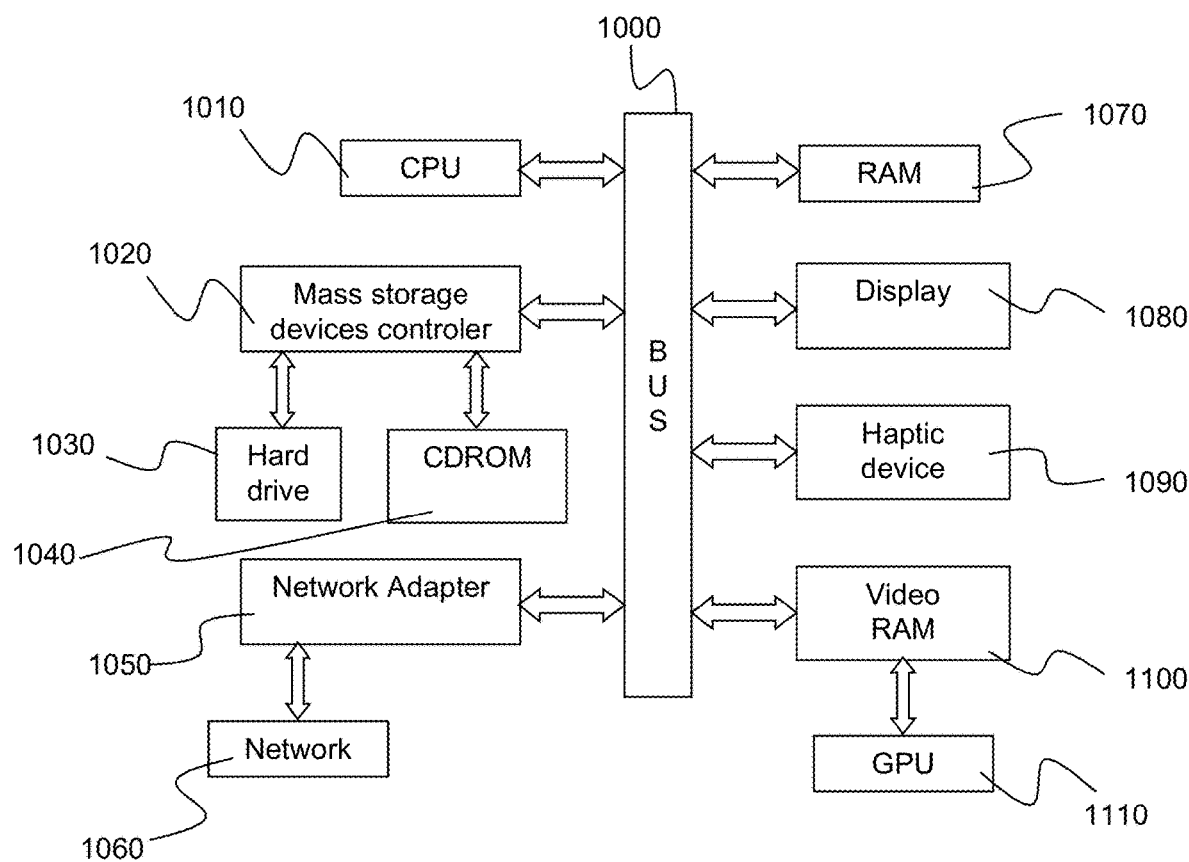
FIG. 21 shows an example of the system.

FIG. 21 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The invention claimed is:

1. A computer-implemented method for segmenting a 3D modeled object representing a mechanical part, the method comprising:
obtaining the 3D modeled object; and performing a hierarchical segmentation of the 3D modeled object, including:
a first segmentation, including identifying, among surfaces of the 3D modeled object, first segments each corresponding to a simple geometric surface of the 3D modeled object, a simple geometric surface being a primitive exhibiting at least one slippable motion, and then
a second segmentation, including identifying, among non-identified surfaces of the 3D modeled object, second segments each corresponding to a free-form surface of the 3D modeled object,
wherein in the first segmentation, the identifying includes exploring and merging neighboring surfaces of the 3D modeled object according to an increasing distance order that is based on one or more first distances quantifying shape similarity between simple geometric surface portions,
wherein in the second segmentation, the identifying includes exploring and merging neighboring non-identified surfaces of the 3D modeled object according to an increasing distance order that is based on one or more second distances quantifying shape similarity between free-form surface portions,
wherein the one or more first distances include one or more of from a group including:
a centroid curvature distance which penalizes mean curvature discrepancy between surfaces,
a border curvature smoothness distance, which rewards curvature smoothness around a boundary between surfaces, and/or and
a centroid normal distance, which penalizes mean normal directions discrepancy between surfaces,
wherein the exploring and the merging in the first segmentation being carried out for each distance of: the centroid curvature distance, the border curvature smoothness distance, and the centroid normal distance,
wherein:
the centroid curvature distance is of a type:

$$d(N_1, N_2) = \max_{i \in \{min,max\}} (\overline{k}_i^{(1)} - \overline{k}_i^{(2)})^2,$$

where $N_1$ and $N_2$ represent neighboring surfaces and $\overline{k}_{min/max}^{(j)}$ maximal curvature of $N_j$,
the border curvature smoothness distance is of a type:

$$d(N_1, N_2) = \sum_{(f_1, f_2)} \max_{i \in \{min,max\}} \left( \frac{k_i^{(f_1)} - k_i^{(f_2)}}{\left[\min\left(|k_i^{(f_1)}|, |k_i^{(f_2)}|\right)\right]_{[k_0, k_1]}} \right)^2,$$

where $N_1$ and $N_2$ represent neighboring surfaces, $(f_1, f_2)$ represent couples of neighboring surface portions belonging respectively to $N_1$ and $N_2$, and $k_{min/max}^{(f_j)}$ ture of $f_j$, $[ \ldots ]_{[k_0,k_1]}$ represents a clamping of a value to a segment $[k_0, k_1]$, and $k_0$ and $k_1$ are regulation values, and
the centroid normal distance is of a type $$d(N_1, N_2) = 1 - \left| \overline{n}^{(1)} \cdot \overline{n}^{(2)} \right|,$$

where $N_1$ and $N_2$ represent neighboring surfaces, and $\overline{n}^{(j)}$ represents a mean normal of $N_j$, and
wherein the method further comprises parameterizing the identified first and second segments each with one or more parameters, thereby making each segment editable by parameter edition and efficiently storable by parameter storing, the 3D modeled object being a result of a real-world physical measurement of the mechanical part such that the measured 3D modeled object is segmented and is processed into an editable data structure.

2. The method of claim 1, wherein the first segmentation further includes, for each surface resulting from the merging, according to a decreasing order of surface size:
fitting a canonic primitive to the surface resulting from the merging,
computing a fitting error,
when the fitting error is lower than a predefined fitting threshold, aggregating to the surface neighboring surfaces for which the fitting error is as well lower than the predefined fitting threshold, and
when the fitting error is larger than the predefined fitting threshold, discarding the surface.

3. The method of claim 1, wherein the one or more first distances include the centroid curvature distance, the border curvature smoothness distance, and the centroid normal distance.

4. The method of claim 1, wherein the one or more second distances consist of one second distance penalizing mean curvature discrepancy between surfaces and/or penalizing irregularity of merged surfaces.

5. The method of claim 4, where the one second distance is of a type:

$$d(N\_1, N\_2) = (|k^-\_\max\hat{\,}((1))| - |k^-\_\max((2))|)^{\wedge}2 \times d\_\text{shape factor}(N\_1, N\_2),$$

where $N_1$ and $N_2$ represent neighboring surfaces, $k^-\_\max\hat{\,}((j))$ represents a mean maximal curvature of $N_j$, and where:

$$d_{shapefactor}(N_1, N_2) = 1 + \max_{i \in \{1,2\}} \left( \left[ \frac{P_{N_1 \cup N_2}}{\sqrt{A_{N_1 \cup N_2}}} - \frac{P_{N_i}}{\sqrt{A_{N_i}}} \right]_{\mathbb{R}^+} \min\left( \frac{A_{N_i}}{\alpha A_{N_{\bar{i}}}}, 1 \right) \right)^2,$$

where $P_N$ represents a perimeter of N, $A_N$ an area of N, $[ \ldots ]_{R^+}$ a clamping to $R^+$, $N_{\bar{i}}$ a node $\in \{N_1, N_2\}$ which isn't $N_i$, and $\alpha$ a hyper-parameter defining a reduced impact of a small surface.

6. The method of claim 1, wherein in the first segmentation and/or in the second segmentation, the exploring and merging is based on a constraint that surfaces connected by a boundary corresponding to a known geometrical delimitation between portions of the 3D modeled object cannot be merged.

7. The method of claim 1, wherein:
in the first segmentation, the identifying includes one or more execution of the exploring and merging each for a respective first distance, each execution being based on a criterion that two surfaces are merged if the respective first distance between these surfaces is lower than a predefined tolerance threshold associated with the respective first distance, and/or
in the second segmentation, the identifying includes one or more execution of the exploring and merging each for a respective second distance, each execution being based on a criterion on a number of second segments or based on a criterion that two surfaces are merged if the respective second distance between these surfaces is lower than a predefined tolerance threshold associated with the respective second distance.

8. A non-transitory computer-readable data storage medium having recorded thereon a computer program comprising instructions for performing a computer-implemented method for segmenting a 3D modeled object representing a mechanical part, the method comprising:
 obtaining the 3D modeled object; and
 performing a hierarchical segmentation of the 3D modeled object, including:
 a first segmentation, including identifying, among surfaces of the 3D modeled object, first segments each corresponding to a simple geometric surface of the 3D modeled object, a simple geometric surface being a primitive exhibiting at least one slippable motion, and then
 a second segmentation, including identifying, among non-identified surfaces of the 3D modeled object, second segments each corresponding to a free-form surface of the 3D modeled object,
 wherein in the first segmentation, the identifying includes exploring and merging neighboring surfaces of the 3D modeled object according to an increasing distance order that is based on one or more first distances quantifying shape similarity between simple geometric surface portions,
 wherein in the second segmentation, the identifying includes exploring and merging neighboring non-identified surfaces of the 3D modeled object according to an increasing distance order that is based on one or more second distances quantifying shape similarity between free-form surface portions,
 wherein the one or more first distances include one or more of selected from a group including:
 a centroid curvature distance which penalizes mean curvature discrepancy between surfaces,
 a border curvature smoothness distance, which rewards curvature smoothness around a boundary between surfaces, and/or and
 a centroid normal distance, which penalizes mean normal directions discrepancy between surfaces, and
 wherein the exploring and the merging in the first segmentation being carried out for each distance of: the centroid curvature distance, the border curvature smoothness distance, and the centroid normal distance, wherein:
 the centroid curvature distance is of a type:

$$d(N_1, N_2) = \max_{i \in \{min, max\}} (\overline{k}_i^{(1)} - \overline{k}_i^{(2)})^2,$$

where $N_1$ and $N_2$ represent neighboring surfaces and $\overline{k}_{min/max}^{(j)}$ maximal curvature of $N_j$,
 the border curvature smoothness distance is of a type:

$$d(N_1, N_2) = \sum_{(f_1, f_2)} \max_{i \in \{min, max\}} \left( \frac{k_i^{(f_1)} - k_i^{(f_2)}}{[\min(|k_i^{(f_1)}|, |k_i^{(f_2)}|)]_{[k_0, k_1]}} \right)^2,$$

where $N_1$ and $N_2$ represent neighboring surfaces, $(f_1, f_2)$ represent couples of neighboring surface portions belonging respectively to $N_1$ and $N_2$, and $k_{min/max}^{(f_j)}$ ture of $f_j$, $[\ldots]_{[k_0, k_1]}$ represents a clamping of a value to a segment $[k_0, k_1]$, and $k_0$ and $k_1$ are regulation values, and
 the centroid normal distance is of a type $$d(N_1, N_2) = 1 - |\overline{n}^{(1)} \cdot \overline{n}^{(2)}|,$$

where $N_1$ and $N_2$ represent neighboring surfaces, and $\overline{n}^{(j)}$ represents a mean normal of $N_j$, and
 wherein the method further comprises parameterizing the identified first and second segments each with one or more parameters, thereby making each segment editable by parameter edition and efficiently storable by parameter storing, the 3D modeled object being a result of a real-world physical measurement of the mechanical part such that the measured 3D modeled object is segmented and is processed into an editable data structure.

9. The non-transitory computer-readable data storage medium of claim 8, wherein the first segmentation further includes, for each surface resulting from the merging, according to a decreasing order of surface size:
 fitting a canonic primitive to the surface resulting from the merging,
 computing a fitting error,
 when the fitting error is lower than a predefined fitting threshold, aggregating to the surface neighboring surfaces for which the fitting error is as well lower than the predefined fitting threshold, and
 when the fitting error is larger than the predefined fitting threshold, discarding the surface.

10. A computer comprising:
 a processor coupled to a memory, the memory having recorded thereon a computer program comprising instructions for segmenting a 3D modeled object representing a mechanical part that when executed by the processor causes the processor to be configured to:
 obtain the 3D modeled object,
 perform a hierarchical segmentation of the 3D modeled object, including:
 a first segmentation, including identifying, among surfaces of the 3D modeled object, first segments each corresponding to a simple geometric surface of the 3D modeled object, a simple geometric surface being a primitive exhibiting at least one slippable motion, and then
 a second segmentation, including identifying, among non-identified surfaces of the 3D modeled object, second segments each corresponding to a free-form surface of the 3D modeled object,
 wherein in the first segmentation, the identifying includes exploring and merging neighboring surfaces of the 3D modeled object according to an increasing distance order that is based on one or more first distances quantifying shape similarity between simple geometric surface portions,
 wherein in the second segmentation, the identifying includes exploring and merging neighboring non-identified surfaces of the 3D modeled object according to an increasing distance order that is based on one or more second distances quantifying shape similarity between free-form surface portions,
 wherein the one or more first distances include one or more of from a group including:
 a centroid curvature distance which penalizes mean curvature discrepancy between surfaces, a border curvature smoothness distance, which rewards curvature smoothness around a boundary between surfaces, and/or and a centroid normal distance, which penalizes mean normal directions discrepancy between surfaces, and wherein the exploring and the merging in the first segmentation being carried out for each distance of: the centroid curvature distance, the border curvature smoothness distance, and the centroid normal distance, wherein:

the centroid curvature distance is of a type:

$$d(N_1, N_2) = \max_{i \in \{min, max\}} \left( \overline{k}_i^{(1)} - \overline{k}_i^{(2)} \right)^2,$$

where $N_1$ and $N_2$ represent neighboring surfaces and $\overline{k}_{min/max}^{(j)}$ maximal curvature of $N_j$, the border curvature smoothness distance is of a type:

$$d(N_1, N_2) = \sum_{\substack{(f_1, f_2) \\ \in Edges}} \max_{i \in \{min, max\}} \left( \frac{k_i^{(f_1)} - k_i^{(f_2)}}{\left[ \min\left( \left| k_i^{(f_1)} \right|, \left| k_i^{(f_2)} \right| \right) \right]_{[k_0, k_1]}} \right)^2,$$

where $N_1$ and $N_2$ represent neighboring surfaces, $(f_1, f_2)$ represent couples of neighboring surface portions belonging respectively to $N_1$ and $N_2$, and $k_{min/max}^{(f_j)}$ ture of $f_j$, $[\ldots]_{[k_0, k_1]}$ represents a clamping of a value to a segment $[k_0, k_1]$, and $k_0$ and $k_1$ are regulation values, and the centroid normal distance is of a type $$d(N_1, N_2) = 1 - |\overline{n}^{(1)} \cdot \overline{n}^{(2)}|,$$

where $N_1$ and $N_2$ represent neighboring surfaces, and $\overline{n}^{(j)}$ represents a mean normal of $N_j$, and wherein the processor is further configured to parameterize the identified first and second segments each with one or more parameters, thereby making each segment editable by parameter edition and efficiently storable by parameter storing, the 3D modeled object being a result of a real-world physical measurement of the mechanical part such that the measured 3D modeled object is segmented and is processed into an editable data structure.

11. The computer of claim 10, wherein the first segmentation further includes, for each surface resulting from the merging, according to a decreasing order of surface size:

fitting a canonic primitive to the surface resulting from the merging, computing a fitting error, when the fitting error is lower than a predefined fitting threshold, aggregating to the surface neighboring surfaces for which the fitting error is as well lower than the predefined fitting threshold, and when the fitting error is larger than the predefined fitting threshold, discarding the surface.

* * * * *